US010225254B2

(12) United States Patent
Watanabe et al.

(10) Patent No.: US 10,225,254 B2
(45) Date of Patent: Mar. 5, 2019

(54) SERVER TRANSMITTING DEVICE INFORMATION ASSIGNED TO SERVICE IDENTIFICATION INFORMATION

(71) Applicant: Brother Kogyo Kabushiki Kaisha, Nagoya-shi, Aichi-ken (JP)

(72) Inventors: Satoshi Watanabe, Nagoya (JP); Hirokazu Banno, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 185 days.

(21) Appl. No.: 15/227,055

(22) Filed: Aug. 3, 2016

(65) Prior Publication Data

US 2017/0093865 A1 Mar. 30, 2017

(30) Foreign Application Priority Data

Sep. 30, 2015 (JP) .................................. 2015-195472

(51) Int. Cl.
*G06F 3/12* (2006.01)
*H04L 29/06* (2006.01)

(52) U.S. Cl.
CPC ............ *H04L 63/10* (2013.01); *G06F 3/1204* (2013.01); *G06F 3/1224* (2013.01);
(Continued)

(58) Field of Classification Search
CPC .... G06F 3/1204; G06F 3/1226; G06F 3/1288; G06F 3/1296; H04L 63/0815
(Continued)

(56) References Cited

U.S. PATENT DOCUMENTS 8,082,323 B2 * 12/2011 Yamaguchi ............. G06F 21/31
358/1.15
8,804,176 B2 * 8/2014 Shirai .................... G06F 3/1222
358/1.1
(Continued)

FOREIGN PATENT DOCUMENTS

| JP | 2008-159022 A | 7/2008 |
| JP | 2012-074023 A | 4/2012 |
| JP | 5339478 B2 | 11/2013 |

OTHER PUBLICATIONS

Feb. 2, 2017—(EP) Extended Search Report—App 16182419.8.

*Primary Examiner* — David J Pearson
(74) *Attorney, Agent, or Firm* — Banner & Witcoff, Ltd.

(57) ABSTRACT

A server receives access request from an information processing apparatus. The access request includes address information of a source web page. The access request is generated in response to reception of the source web page. The server receives authentication information from the information processing apparatus to authenticate the information processing apparatus, and receives display request from the authenticated information processing apparatus. The display request is for displaying, by the information processing apparatus, a set of device information in a storage. In response to the display request, the server determines whether the address information in the received access request indicates the service-providing apparatus or the server by referring to the first and second address information, and when the address information indicates the service-providing apparatus, transmits to the information processing apparatus, at least one set of device information assigned to the service identification information indicating a service that a service-providing apparatus provides.

11 Claims, 21 Drawing Sheets

(52) U.S. Cl.
CPC .......... *G06F 3/1226* (2013.01); *G06F 3/1237* (2013.01); *G06F 3/1288* (2013.01); *H04L 63/0876* (2013.01)

(58) Field of Classification Search
USPC .......................................................... 726/4
See application file for complete search history.

(56) References Cited

U.S. PATENT DOCUMENTS

| | | |
|---|---|---|
| 2008/0126228 A1 | 5/2008 | Nagai et al. |
| 2012/0182573 A1* | 7/2012 | Mok ..................... G06F 3/1204 358/1.15 |
| 2013/0117835 A1* | 5/2013 | Oguma ................... G06F 21/41 726/8 |
| 2013/0148155 A1 | 6/2013 | Kitagata |
| 2014/0090028 A1* | 3/2014 | Matsugashita .......... H04L 63/08 726/4 |
| 2015/0261482 A1 | 9/2015 | Takano |
| 2015/0277821 A1* | 10/2015 | Mori ..................... G06F 3/1236 358/1.15 |
| 2017/0017448 A1* | 1/2017 | Hirata ................... G06F 3/1229 |

* cited by examiner

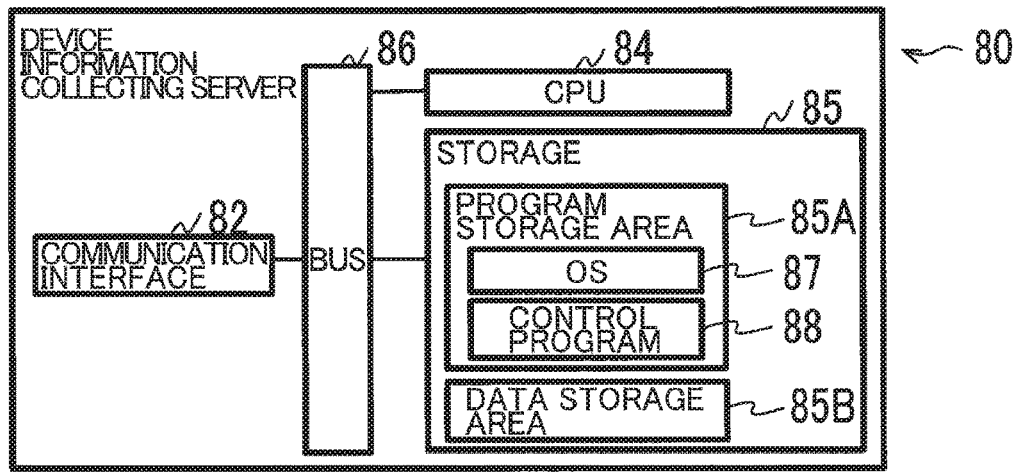
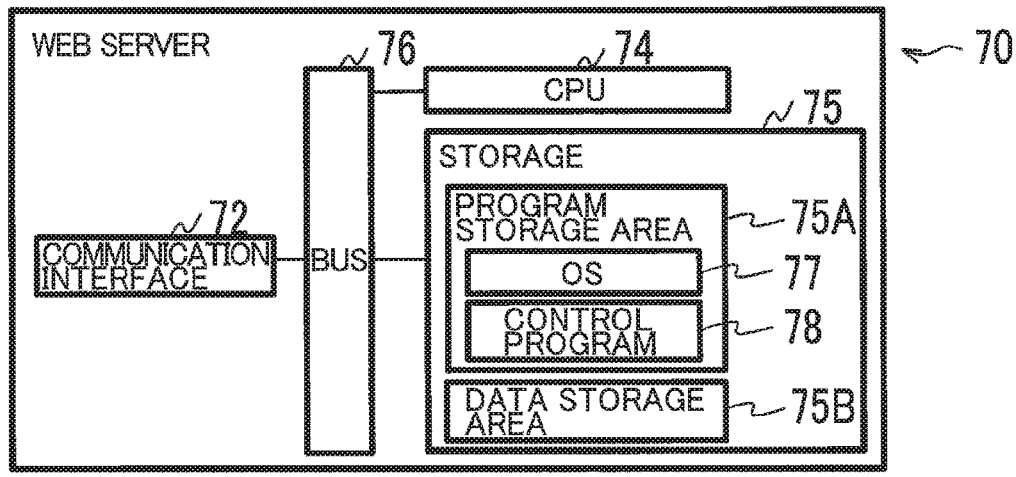
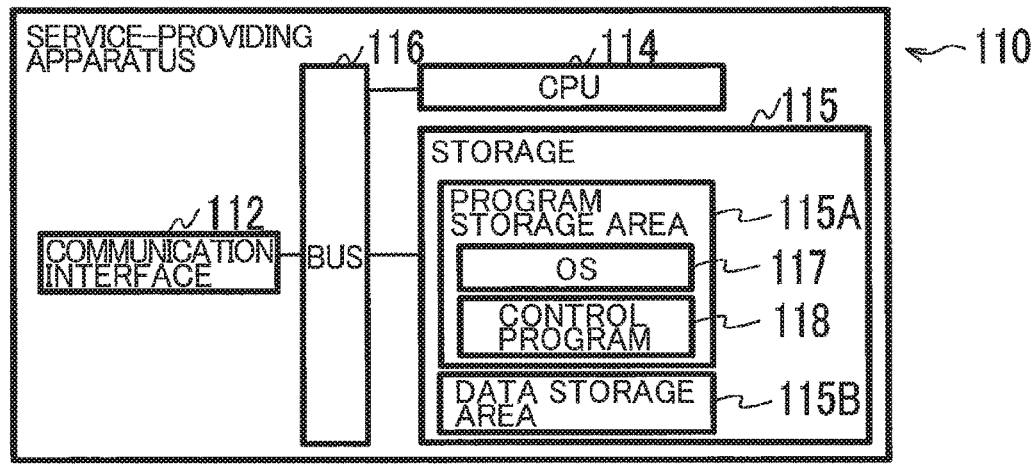

FIG. 4(A)
SERVICE LIST

| SERVICE ID | SERVICE URL |
|---|---|
| — | http://aaa.aaa.aaa |
| — | http://bbb.bbb.bbb |
| — | http://ccc.ccc.ccc |
| — | http://ddd.ddd.ddd |
| ⋮ | ⋮ |

FIG. 4(B)
FIRST ACCOUNT LIST

| FIRST USER ID | USER INFORMATION | SESSION ID |
|---|---|---|
| 100 | — | — |
| 101 | — | — |
| 102 | — | — |
| ⋮ | ⋮ | ⋮ |

| DEVICE ID | DEVICE NAME | MODEL NAME | SERVICE ID |
|---|---|---|---|
| OOOOOO | PRINTER 6 | MFP-C | — |
| PPPPPP | PRINTER 7 | MFP-A | — |

| DEVICE ID | DEVICE NAME | MODEL NAME | SERVICE ID |
|---|---|---|---|
| JJJJJJ | PRINTER 1 | MFP-A | — |
| LLLLLL | PRINTER 2 | MFP-B | — |
| MMMMMM | PRINTER 3 | MFP-C | — |
| NNNNNN | PRINTER 4 | MFP-D | — |
| RRRRRR | PRINTER 5 | MFP-E | — |

FIG. 5(A)

SECOND ACCOUNT LIST

| FIRST USER ID | USER INFO | PIN |
|---|---|---|
| 100 | — | — |
| 101 | — | — |
| 102 | — | — |
| ⋮ | ⋮ | ⋮ |

| DEVICE ID | DEVICE NAME | MODEL NAME |
|---|---|---|
| OOOOOO | PRINTER 6 | MFP−C |
| PPPPPP | PRINTER 7 | MFP−A |

| DEVICE ID | DEVICE NAME | MODEL NAME |
|---|---|---|
| JJJJJJ | PRINTER 1 | MFP−A |
| LLLLLL | PRINTER 2 | MFP−B |
| MMMMMM | PRINTER 3 | MFP−C |
| NNNNNN | PRINTER 4 | MFP−D |
| RRRRRR | PRINTER 5 | MFP−E |

FIG. 5(B)

CONNECTION STATUS LIST

| DEVICE ID | CONNECTION STATUS |
|---|---|
| JJJJJJ | NON-CONNECTED |
| LLLLLL | CONNECTED |
| MMMMMM | NON-CONNECTED |
| NNNNNN | CONNECTED |
| ⋮ | ⋮ |

FIG. 6(A)
SERVICE CATEGORY LIST

| SERVICE ID | CATEGORY |
|---|---|
| A | 1 |
| B | 2 |
| C | 2 |
| D | 1 |
| ⋮ | ⋮ |

FIG. 6(B)
REGISTERED SERVICE LIST

| FIRST USER ID | DEVICE ID | SERVICE ID | REGISTRATION DATE | AUTHENTICATION INFO |
|---|---|---|---|---|
| 100 | JJJJJJ | A | 2015/07/02 | 54321 |
| 104 | LLLLLL | A | 2015/08/11 | — |
| 106 | MMMMMM | D | 2015/08/09 | — |
| ⋮ | ⋮ | ⋮ | ⋮ | ⋮ |

FIG. 6(C)
SERVICE AVAILABILITY LIST

| MODEL NAME | SERVICE A | SERVICE B | ・・・ |
|---|---|---|---|
| MFP−A | ○ | ○ | ・・・ |
| MFP−B | ○ | × | ・・・ |
| MFP−C | × | ○ | ・・・ |
| MFP−D | ○ | ○ | ・・・ |
| ⋮ | ⋮ | ⋮ | ⋮ |

FIG. 7

SERVICE MANAGEMENT LIST

| SECOND USER ID | USER INFO | SERVICE ID | REGISTRATION DATE | AUTHENTICATION INFO | SERVICE SETTINGS INFO |
|---|---|---|---|---|---|
| A1000 | — | A | 2015/07/02 | 54321 | — |
| A1000 | — | A | — | — | — |
| A1005 | — | A | — | — | — |
| A1010 | — | D | — | — | — |
| ... | ... | ... | ... | ... | ... |

FIG. 20

| DEVICE LIST PAGE | | | | |
|---|---|---|---|---|
| REGISTER DEVICE ~141 | | | | |
| DEVICE NAME | MODEL NAME | CONNECTION STATUS | | SERVICE INFORMATION |
| PRINTER 1 | MFP-A | DISCONNECTED PLEASE CHECK DEVICE | REGISTERED JULY 2, 2015 | SERVICE A   CHANGE SETTINGS ~145 / CANCEL |
| PRINTER 2 | MFP-B | CONNECTED | UNREGISTERED | REGISTER |
| PRINTER 3 | MFP-C | DISCONNECTED PLEASE CHECK DEVICE | UNREGISTERED | |
| PRINTER 4 | MFP-D | CONNECTED | REGISTERED JULY 23, 2015 | SERVICE A   CHANGE SETTINGS ~143 / CANCEL ~144 |
| PRINTER 5 | MFP-E | REGISTER DEVICE ~142 | | |

FIG. 21

SERVICE REGISTRATION PAGE

TYPES OF TRANSLATION

⦿ ENGLISH → JAPANESE

◯ JAPANESE → ENGLISH

◯ CHINESE → JAPANESE

◯ JAPANESE → CHINESE

SELECT ~151

SERVER TRANSMITTING DEVICE INFORMATION ASSIGNED TO SERVICE IDENTIFICATION INFORMATION

CROSS REFERENCE TO RELATED APPLICATION

This application claims priority from Japanese Patent Application No. 2015-195472 filed Sep. 30, 2015. The entire content of the priority application is incorporated herein by reference.

TECHNICAL FIELD

The present disclosure relates to a server that supports the provision of services related to image-processing apparatuses.

BACKGROUND

There are order support systems known in the art that assist users of printers and other apparatuses in ordering consumable supplies for the apparatuses on the basis of data transmitted from the apparatuses to a server through client computers. For example, one service known in the art supports the ordering of consumables for apparatuses through a system. The system includes a client computer connected to a plurality of apparatuses, and an order supporting server connected to the client computer over a network. The client computer collects information indicating the status of the apparatuses, such as the remaining quantity of a consumable product used in the apparatuses. When the remaining quantity of a consumable is determined to be insufficient, the client computer notifies the order supporting server of information indicating the insufficiency of the remaining quantity. In response to the notification from a client computer, the order supporting server transmits, to a preregistered address, e-mail providing the URL for a web page through which the consumable can be ordered.

SUMMARY

With the conventional system described above, the user must employ a web browser on the client computer, for example, to register specific apparatuses on the server for services intended for those apparatuses and must edit the settings of services that have already been registered through the web browser. This system requires a technology that can facilitate operations for registering for and editing services.

In view of the foregoing, it is an object of the present disclosure to provide a server that can easily identify what image-processing apparatuses can use specific services.

In order to attain the above and other objects, the disclosure provides a server. The server includes a communication interface, a storage, and a processor. The communication interface is configured to communicate with an information processing apparatus, a plurality of image processing apparatuses, and a service-providing apparatus. Each of the plurality of image processing apparatuses is configured to process an image. The service-providing apparatus is configured to provide a service using one of the plurality of image processing apparatuses. The storage stores first authentication information, a plurality of sets of device information, service identification information, first address information, the second address information, and instructions. The plurality of sets of device information respectively identifies the plurality of image processing apparatuses. The plurality of sets of device information is assigned with the first authentication information. The service identification information is for identifying the service that the service-providing apparatus is configured to provide. The service identification information is assigned with one of the plurality of sets of device information. The first address information is information of a first web page provided by the service-providing apparatus. The second address information is information for a second web page provided by the server. The instructions, when executed by the processor, cause the server to: receive access request from the information processing apparatus via the communication interface, the access request being for accessing the server and including address information of a source web page, the access request being generated in response to reception of the source web page; receive second authentication information from the information processing apparatus via the communication interface to authenticate the information processing apparatus; authenticate the information processing apparatus when the received second authentication information is determined to match the stored first authentication information; receive display request via the communication interface from the authenticated information processing apparatus using the second authentication information, the display request being for displaying, by the information processing apparatus, a set of device information from among the plurality of sets of device information stored in the storage; in response to the display request, determine whether the address information of the source web page in the received access request indicates the service-providing apparatus or the server by referring to the first address information and the second address information; and when the address information of the source web page indicates the service-providing apparatus, transmit to the information processing apparatus via the communication interface, one set of device information assigned to the service identification information indicating the service that the service-providing apparatus is configured to provide from among the plurality of sets of device information stored in the storage in association with the second authentication information that is determined to match the first authentication information.

According to another aspects, the disclosure provides a communication system comprising a server and an information processing apparatus. The server includes a server communication interface, a storage, and a server processor. The server communication interface is configured to communicate with the information processing apparatus, a plurality of image processing apparatuses, and a service-providing apparatus. Each of the plurality of image processing apparatuses is configured to process an image, the service-providing apparatus being configured to provide a service using one of the plurality of image processing apparatuses. The storage stores first authentication information, a plurality of sets of device information, service identification information, first address information, and second address information. The plurality of sets of device information respectively identifies the plurality of image processing apparatuses. The plurality of sets of device information is assigned with the first authentication information. The service identification information is for identifying the service that the service-providing apparatus is configured to provide. The service identification information is assigned with one of the plurality of sets of device information. The first address information is information of a first web page provided by the service-providing apparatus. The second address information is information for a second web page provided by the server. The information processing apparatus includes a display, a client communication interface, a client processor, and a client storage. The client communication interface is configured to communicate with the server communication interface. The client storage is configured to store instructions, when executed by the client processor, cause the information processing apparatus to: transmit access request to the server via the client communication interface, the access request being for accessing the server and including address information of a source web page, the access request being generated in response to reception of the source web page; transmit second authentication information to the server via the client communication interface; transmit display request to the server via the client communication interface, the display request being for displaying, by the information processing apparatus, a set of device information from among the plurality of sets of device information stored in the storage; and in response to receiving the display information from the server via the client communication interface, display at least one set of display information on the display. the storage is further stores instructions, when executed by the processor, cause the server to: receive the access request from the information processing apparatus via the server communication interface; receive the second authentication information from the information processing apparatus via the server communication interface to authenticate the information processing apparatus; authenticate the information processing apparatus when the received second authentication information is determined to match the stored first authentication information; receive display request via the server communication interface from the authenticated information processing apparatus from which the second authentication information is transmitted; in response to the display request, determine whether the address information of the source web page in the received access request indicates the service-providing apparatus or the server by referring to the first address information and the second address information; and when the address information of the source web page indicates the service-providing apparatus, transmit to the information processing apparatus via the server communication interface, the at least one set of device information assigned to the service identification information indicating the service that the service-providing apparatus is configured to provide from among the plurality of sets of device information stored in the storage in association with the second authentication information that is determined to match the first authentication information.

BRIEF DESCRIPTION OF THE DRAWINGS

The particular features and advantages of the disclosure as well as other objects will become apparent from the following description taken in connection with the accompanying drawings, in which:

FIG. 3(A) is a block diagram illustrating a device information collecting server according to the embodiment;

FIG. 3(B) is a block diagram illustrating a web server according to the embodiment;

FIG. 3(C) is a block diagram illustrating a service-providing apparatus according to the embodiment;

FIG. 4(A) is an example of a service list stored in the web server;

FIG. 4(B) is an example of a first account list stored in the web server;

FIG. 5(A) is an example of a second account list stored in the device information collecting server;

FIG. 5(B) is an example of a connection status list stored in the device information collecting server;

FIG. 6(A) is an example of a service category list stored in the service managing server;

FIG. 6(B) is an example of a registered service list stored in the service managing server;

FIG. 6(C) is an example of a service availability list stored in the service managing server;

FIG. 7 is an example of a service management list stored in the service-providing apparatus;

FIG. 20 is an example of a device list page displayed on the information processing apparatus; and FIG. 21 is an example of a translation service registration page displayed on the information processing apparatus.

DETAILED DESCRIPTION

Figure 1:
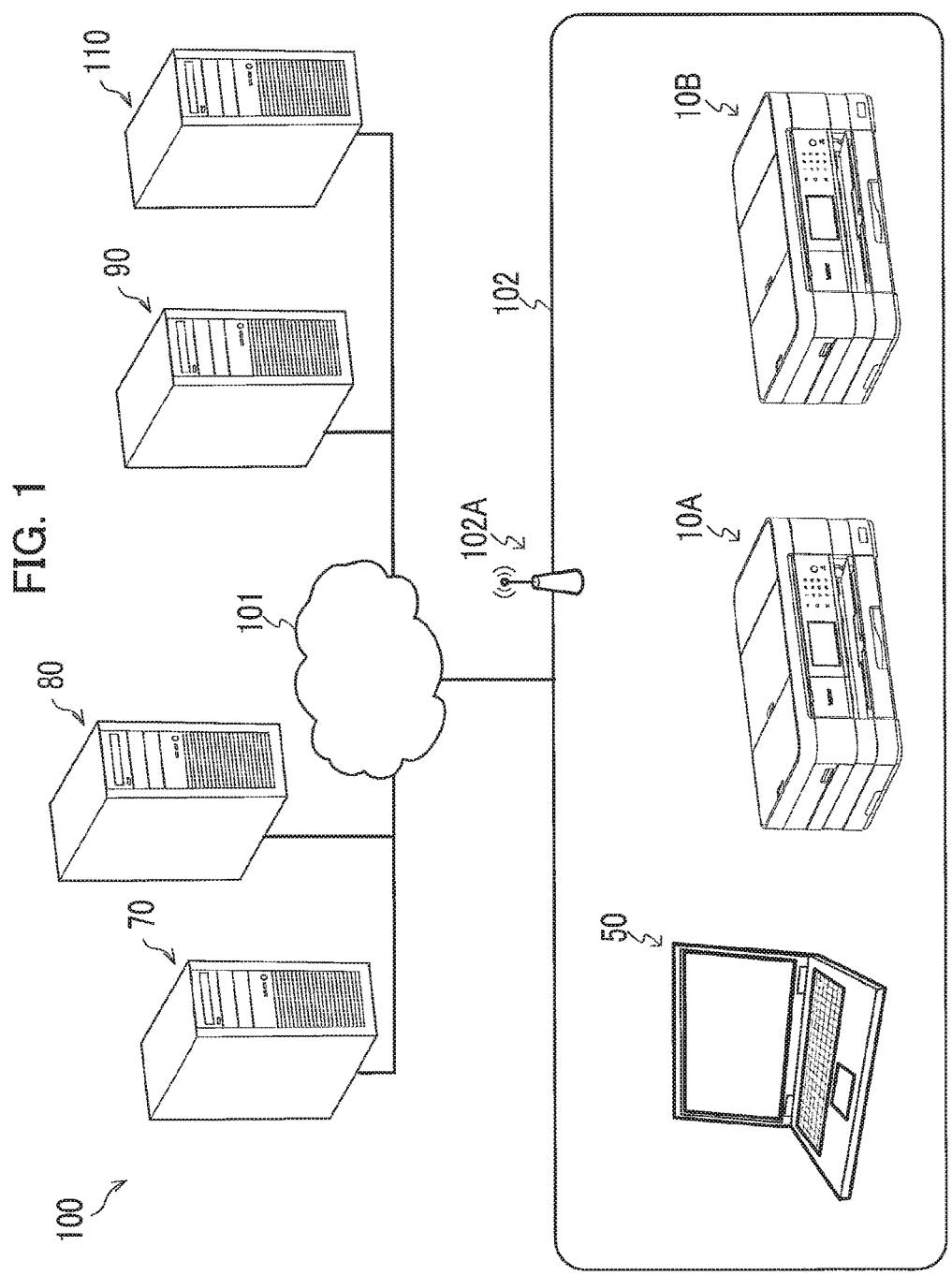
FIG. 1 is a schematic diagram showing a communication system according to an embodiment.

FIG. 1 is a schematic diagram showing a communication system 100 according to an embodiment. The communication system 100 shown in FIG. 1 includes two multifunction peripherals 10A and 10B (hereinafter also collectively referred to as "multifunction peripherals 10"), an information processing apparatus 50, a web server 70, a device information collecting server 80, and a service managing server 90. The communication system 100 enables users of the multifunction peripherals 10 to access services provided by a service-providing apparatus 110. The multifunction peripherals 10, the information processing apparatus 50, the web server 70, the device information collecting server 80, the service managing server 90, and the service-providing apparatus 110 can communicate with each other over a communication network. While there are no particular limitations on the structure of the communication network, the network may include an Internet 101, a wired local area network (LAN), a wireless LAN 102, or any combination of these. The web server 70, the device information collecting server 80, and the service managing server 90 are provided by the manufacturer or vendor of the multifunction peripherals 10, for example, and work together to manage the multifunction peripherals 10. On the other hand, the service-providing apparatus 110 in the embodiment may be a device provided by a service-providing company unrelated to the manufacturer or vendor of the multifunction peripherals 10. Accordingly, the web server 70, the device information collecting server 80, and the service managing server 90 can synchronize information related to the multifunction peripherals 10 when necessary. However, some kind of authentication information must be used when storing information related to the multifunction peripherals 10 on the service-providing apparatus 110 in order to be authenticated by the service-providing apparatus 110. By providing the service-providing apparatus 110 separately from the web server 70, the device information collecting server 80, and the service managing server 90 in this way, a plurality of service-providing companies can establish a plurality of service-providing apparatuses 110, thereby offering numerous services for the multifunction peripherals 10. Here, the web server 70, the device information collecting server 80, and the service managing server 90 are all examples of the servers.

The multifunction peripherals 10 and the information processing apparatus 50 reside on the wireless LAN 102. Further, the wireless LAN 102 is connected to the Internet 101 through a router 102A. The web server 70, the device information collecting server 80, the service managing server 90, and the service-providing apparatus 110 are also connected to the Internet 101. The multifunction peripherals 10 and the information processing apparatus 50 can communicate with the web server 70, the device information collecting server 80, the service managing server 90, and the service-providing apparatus 110 on the Internet 101 via the router 102A. Note that the multifunction peripherals 10 and the information processing apparatus 50 may also belong to different communication networks.

Local IP addresses are assigned to each port of the router 102A on the wireless LAN 102 side, a communication interface 25 in each of the multifunction peripherals 10A and 10B, and a communication interface 55 in the information processing apparatus 50. Hence, the router 102A functions as the access point of the wireless LAN. The router 102A relays wireless LAN communications among apparatuses connected to the router 102A according to wireless LAN protocol. Hence, "residing on the wireless LAN 102" denotes a state in which a device is connected to the router 102A according to a wireless LAN connection protocol.

On the other hand, a global IP Address is assigned to the port of the router 102A on the internet 101 side, a communication interface 72 in the web server 70, a communication interface 82 in the device information collecting server 80, a communication interface 92 in the service managing server 90, and a communication interface 112 in the service-providing apparatus 110. Thus, the router 102A functions as a firewall.

More specifically, the router 102A relays requests transmitted from a multifunction peripheral 10 to the device information collecting server 80 and responses to requests transmitted from the device information collecting server 80 to the multifunction peripheral 10. However, the router 102A denies requests transmitted from the device information collecting server 80 to the multifunction peripherals 10. The router 102A implements the same functions for communications between any multifunction peripheral 10 and the web server 70, the service managing server 90, or the service-providing apparatus 110 and communications between the information processing apparatus 50 and the web server 70, the device information collecting server 80, the service managing server 90, or the service-providing apparatus 110. Thus, the multifunction peripherals 10A and 10B and the information processing apparatus 50 belong to a network protected by a firewall and communicate with the web server 70, the device information collecting server 80, the service managing server 90, and the service-providing apparatus 110 through the firewall.

Multifunction Peripheral 10

Figure 2A:
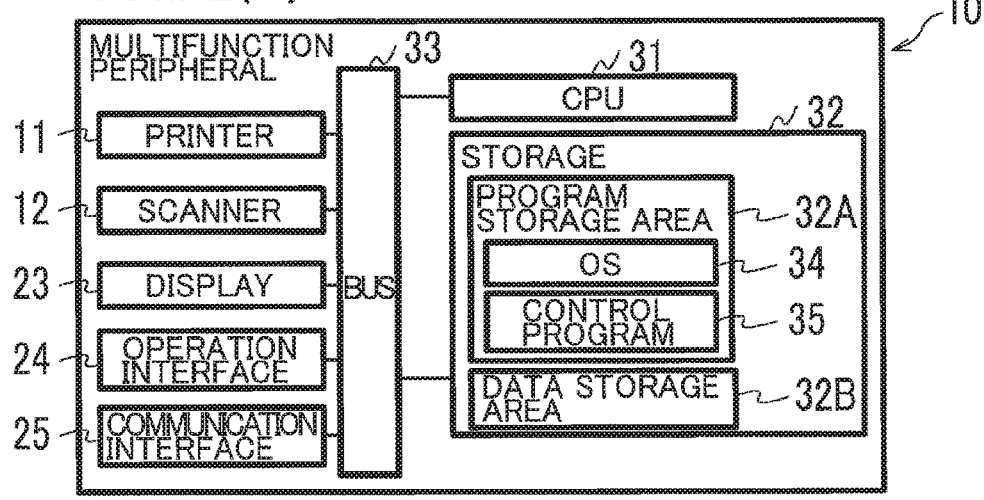
FIG. 2(A) is a block diagram illustrating a multifunction peripheral according to the embodiment.

As shown in FIG. 2(A), the multifunction peripheral 10 primarily includes a printer 11, a scanner 12, a display 23, an operation interface 24, a communication interface 25, a CPU 31, and a storage 32, all of which are interconnected via a communication bus 33. The multifunction peripheral 10 is an example of the image processing apparatus. The printer 11 and the scanner 12 are examples of the image controllers that form images on printing media. The communication interface 25 is an example of the communication interface.

Printer 11 and Scanner 12

The printer 11 executes a printing process to record an image specified by image data on recording paper. The method of recording employed by the printer 11 may be any well-known method, including an inkjet method and electrophotographic method. The scanner 12 executes a scanning process to read an image recorded on a recording paper and to generate image data. The multifunction peripheral 10 may include a facsimile function for transmitting and receiving facsimile data and a copying function for reading an image recorded on recording paper and recording this image on another sheet of recording paper.

Display 23

The display 23 includes a display screen for displaying various information. The display 23 may be configured of a liquid crystal display (LCD) or an organic electro-luminescence display (organic EL display), for example.

Operation Interface 24

The operation interface 24 receives operations from the user when the user selects objects displayed on the display screen of the display 23. More specifically, the operation interface 24 has buttons and outputs various operating signals to the CPU 31 corresponding to buttons that have been pressed. The operation interface 24 may also include a film-like touch sensor laid over the display screen of the display 23. In other words, the display 23 may be configured as a touchscreen display.

Note that the term "object" used in this description denotes an image that the user can select by operating the operation interface 24. Example of an object is a character string, buttons, and links displayed on the display 23.

Communication Interface 25

The communication interface 25 is an interface for implementing communications with external apparatuses. More specifically, the communication interface 25 can communicate with the image processing apparatus 50, the information collecting server 80. The communication interface 25 uses a communication method that conforms to the IEEE 802.11 standard, or Wi-Fi (registered trademark of Wi-Fi Alliance) for example.

CPU 31

The CPU (central processing unit) 31 functions to control all operations of the multifunction peripheral 10. The CPU 31 acquires various programs described later from the storage 32 and executes the programs on the basis of various information outputted from the operation interface 24 and various information and the like acquired from external apparatuses via the communication interface 25.

Storage 32

The storage 32 has a program storage area 32A, and a data storage area 32B. The program storage area 32A stores an operating system (OS) 34, and a control program 35. The OS 34 and the control program 35 are programs built in binary format. The control program 35 may be a single program or an aggregate of programs. The data storage area 32B stores data or information required to execute the control program 35.

Note that the terms "data" and "information" in the following descriptions used share aspects of being bits or bit strings that computers can handle. The computer treats "data" without considering the significance of its individual bits. In the case of "information," on the other hand, the computer's operations branch based on the significance of the individual bits. Additionally, an "instruction" is a control signal prompting the destination apparatus to perform the next operation. An instruction may include information and may itself possess the properties of information.

Further, data and information are treated as the same data and information even when the format (such as a text format, binary format, or flag format) is modified for different computers, provided that the computers can recognize the same content. For example, information specifying the number "two" may be stored in one computer as information in the text format for the ASCII code "0x32", and may be stored in a different computer as information in the binary format for the binary notation "10".

However, the distinction between data and information is not strictly enforced; exceptions to the rule may be allowed. For example, data may be temporarily treated as information, while information may be temporarily treated as data. Further, certain bits or bit strings may be treated as data on one apparatus and treated as information on another. Further, information may be extracted from data, and data may be extracted from information.

The storage 32 is configured of random access memory (RAM), read-only memory (ROM), electrically erasable programmable read-only memory (EEPROM), a hard disk drive (HDD), a buffer provided in the CPU 31, or a combination of these, for example.

Note that the storage 32 may be any storage medium that can be read by a computer. A computer-readable storage medium is a non-transitory medium. In addition to the above examples, non-transitory media include CD-ROM and DVD-ROM. A non-transitory medium is also a tangible medium. On the other hand, electric signals that convey programs downloaded from a server or the like on the Internet are a computer-readable signal medium, which is one type of computer-readable medium but is not considered a non-transitory computer-readable storage medium.

The CPU 31 executes programs stored in the program storage area 32A. However, in the following descriptions may omit the CPU 31 when describing operations of the programs. In other words, the phrasing "Program A executes Process A" in the following description may be used to signify that "the CPU 31 executes Process A described in Program A." The same holds true for programs executed on the web server 70, the device information collecting server 80, the service managing server 90, and the service-providing apparatus 110, described later.

The programs stored in the program storage area 32A determine the results of events and execute operations based on these results. However, this specification will omit a description of such determinations and will merely describe the operations of each program. Thus, the expression in the following description "the control program executes Process A in response to Condition A" will be used to denote the meaning "the control program determines whether Condition A has been met and executes Process A in response to a positive determination that Condition A has been met."

Further, the programs stored in the program storage area 32A identify, extract, or select data and the like. Here, the identification of data and the like denotes a process in which the program identifies data from a plurality of data sets that matches a condition, and stores the data and the like itself or information identifying the data and the like in a predetermined storage area. Here, information identifying data and the like may be identification information for identifying the data and the like, an index of an array in which the data and the like is stored, or a pointer for a storage area in which the data and the like are stored, for example. The programs perform similar processes for extracting or selecting data and the like.

Further, the programs stored in the program storage area 32A acquire data and the like. For example, the acquisition of data and the like may denote a process in which a program reads data from the storage area in which the data is stored; a process in which the program receives data transmitted from an external apparatus; a process in which the program requests the transmission of data from an external apparatus and receives the data transmitted from the external apparatus; a process in which the program receives data outputted from the OS or other program; or a process in which the program requests the output of data from another program and receives the data outputted from the other program.

The OS 34 is the underlying software that provides an application programming interface (API) for controlling the hardware constituting the multifunction peripheral 10, including the printer 11, the scanner 12, the display 23, the operating interface 24, and the communication interface 25. Hence, the programs described above control the hardware of the multifunction peripheral 10 by calling the API provided in the OS 34. However, the role of the OS 34 will not be included in a description of operations performed by the programs in this specification. Thus, the phrase "Program B controls Hardware C" in the following description may be used to signify that "Program B controls Hardware C through the API of the OS 34."

Note that the above description for basic operations of programs is similarly applicable to programs stored on the information processing apparatus 50, the web server 70, the device information collecting server 80, and the service managing server 90 described later and is not merely limited to programs stored in the program storage area 32A.

While omitted from the drawings, the multifunction peripheral 10 also stores various device-related information. This information includes the serial number, device ID, device name, and model name of the multifunction peripheral 10, for example. This information may also be dispersed among and stored in a control board, a management information base (MIB), or the data storage area 32B of the multifunction peripheral 10, for example.

The serial number is a unique number assigned to each multifunction peripheral 10 by the manufacturer. The device ID is unique information assigned to each individual multifunction peripherals 10A and 10B and is an example of the device information. The device ID may be generated on the basis of information stored on the control board mounted in the individual multifunction peripherals 10A and 10B, for example. The serial number may also be used as the device ID. Note that the device information may be information uniquely assigned to the multifunction peripheral 10 or a combination of the various information described above.

The device name is a name for the multifunction peripheral 10 identified by a corresponding device ID. The device name may be pre-assigned to the multifunction peripheral 10 or may be arbitrarily assigned by the user of the multifunction peripheral 10. The model name is the model of the multifunction peripheral 10 identified by the corresponding device ID. The model name is used to determine what functions the multifunction peripheral 10 possesses, for example. The model name is pre-assigned to the multifunction peripheral 10.

In the embodiment, the multifunction peripheral 10A is the multifunction peripheral 10 having device ID "JJJJJJ," the device name "Printer 1," and the model name "MFP-A." The multifunction peripheral 10B is the multifunction peripheral 10 having device ID "LLLLLL," the device name "Printer 2," and the model name "MFP-B." The detailed explanation of the serial number has been omitted in this specification.

Information Processing Apparatus 50

Figure 2B:
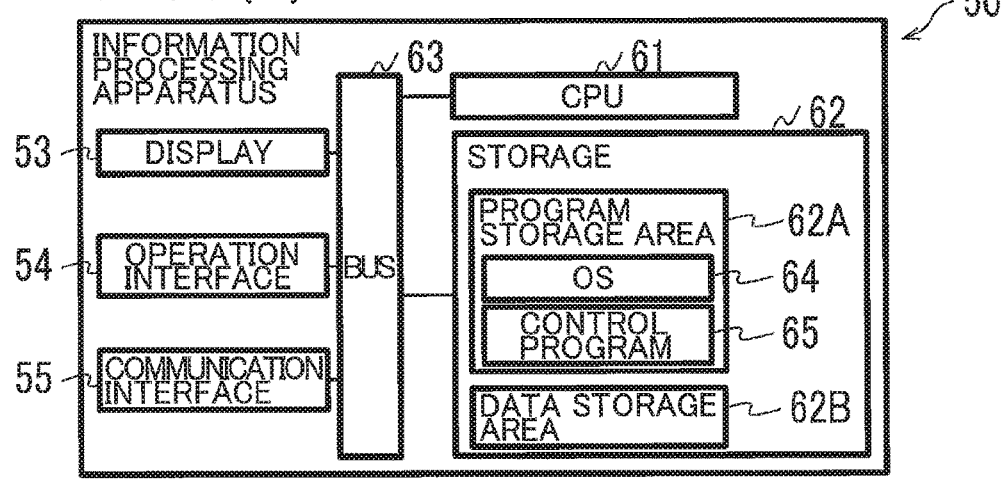
FIG. 2(B) is a block diagram illustrating an information processing apparatus according to the embodiment.

As shown in FIG. 2(B), the information processing apparatus 50 primarily includes a display 53, an operating interface 54, a communication interface 55, a CPU 61, a storage 62, and a communication bus 63. The CPU 61 and the storage 62 constitute an example of the client controller. Since the display 53, the operating interface 54, the CPU 61, the storage 62, and the communication bus 63 in the information processing apparatus 50 share the same essential form as the corresponding display 23, the operating interface 24, the CPU 31, the storage 32, and the communication bus 33 in the multifunction peripheral 10, a description of these components will not be repeated. The communication interface 55 is an interface for communicating with an external apparatus. Specifically, the communication interface 55 can communicate with the multifunction peripheral 10, the web server 70, and the service-providing apparatus 110. The information processing apparatus 50 may be a mobile phone, a smartphone, a tablet terminal apparatus, or a personal computer, for example. The control program 65 is a browser program, for example.

Web Server 70

As shown in FIG. 3(B), the web server 70 primarily includes a communication interface 72, a CPU 74, a storage 75, and a communication bus 76. The CPU 74 and the storage 75 constitute an example of a controller. Since the CPU 74, the storage 75, and the communication bus 76 in the web server 70 share the same essential form as the corresponding the CPU 31, the storage 32, and the communication bus 33 in the multifunction peripheral 10, a description of these components will not be repeated. The communication interface 72 is an interface for communicating with an external apparatus. Specifically, the communication interface 72 can communicate with the information processing apparatus 50, the information collecting server 80, the service managing server 90, and the service-providing apparatus 110.

As shown in FIG. 4(A), the data storage area 75B can store service list configured to include a plurality of service records. Each service record includes a service ID and a service URL (uniform resource locators) association with each other.

The service ID is information for identifying a service provided by the service-providing apparatus 110. Each service record is uniquely identified by a service ID. The service ID is an example of the service identification information.

The service URL is an example of address information for a web page providing a service, and specifically is the URL indicating the web page providing the service identified by the service ID. A service URL for each service provided by the service-providing apparatus 110 described later designates a location in a data storage area 115B of the service-providing apparatus 110.

As shown in FIG. 4(B), the data storage area 75B can store first account list configured to include a plurality of first account records. Each account record includes a first user ID, user information, a session ID, device ID(s), device name(s), model name(s), and service ID(s) in association with one another.

Each first account record is uniquely identified by a first user ID. The first user ID serves to identify the user of the multifunction peripheral 10 specified in the corresponding user information. The first user ID is information specifying that the web server 70 and the device information collecting server 80 have authenticated the user of the multifunction peripheral 10 and indicates that the user has authorization to access the web server 70 and the device information collecting server 80. The first user ID may be a combination of a user ID and password. The first user ID is an example of authentication information.

The user information is information about the user to which the corresponding first user ID has been assigned. The user information may include any of various information about the user, such as the user's full name, address, telephone number, and credit card number.

The session ID is information associated with the first user ID. The session ID serves to identify whether a session between the information processing apparatus 50 and the web server 70 is a continuous session and that the information processing apparatus 50 is in a logged-in state. The web server 70 issues a session ID when executing a login process described later, and transmits the session ID to the information processing apparatus 50. The information processing apparatus 50 receives and stores the session ID in the data storage area 62B. The information processing apparatus 50 attaches the session ID to any information transmitted to the web server 70 while the information processing apparatus 50 is in a logged-in state. Note that the session ID may be deleted after the web server 70 has issued the ID once a prescribed time interval has elapsed.

The device IDs, device names, model names, and service IDs in the first account list are identical to the same information described above. Each first account record may possess a link to a plurality of sets of correlated information, wherein one set includes a device ID, a device name, a model name, and a service ID. In other words, each first account record may include a plurality of sets of device IDs, device names, model names, and service IDs associated with each other. Sets that include a device ID, device name, a model name, and a service ID can be registered in the first account list independently of the process described later with reference to FIG. 10.

Device Information Collecting Server 80

As shown in FIG. 3(A), the device information collecting server 80 includes a communication interface 82, a CPU 84, a storage 85, and a communication bus 86. The CPU 84 and the storage 85 constitute an example of a controller. Since the CPU 84, the storage 85, and the communication bus 86 in the device information collecting server 80 share the same essential form as the corresponding the CPU 31, the storage 32, and the communication bus 33 in the multifunction peripheral 10, a description of these components will not be repeated. The communication interface 82 is an interface for communicating with an external apparatus. Specifically, the communication interface 82 can communicate with the multifunction peripheral 10, the web server 70, and the service managing server 90.

As shown in FIG. 5(A), the data storage area 85B can store a second account list configured to include a plurality of second account records. Each second account record stores the same information as that stored in the first account list shown in FIG. 4(B), excluding the session ID and the service ID(s). Further, each second account record stores PIN.

As shown in FIG. 5(B), the data storage area 85B can store a connection status list configured to store a plurality of connection status records. Each connection status record includes a device ID and a connection status in association with each other. The device ID in the connection status records is the same information described above.

The connection status is information indicating whether the multifunction peripheral 10 identified by the device ID is in a connected state or a non-connected state.

Service Managing Server 90

Figure 2C:
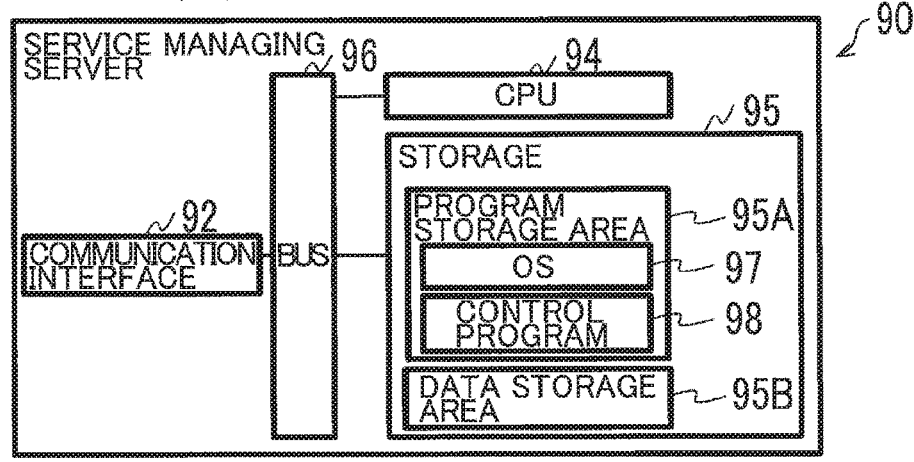
FIG. 2(C) is a block diagram illustrating a service managing server according to the embodiment.

As shown in FIG. 2(C), the service managing server 90 includes a communication interface 92, a CPU 94, a storage 95, and a communication bus 96. The CPU 94 and the storage 95 constitute an example of a controller. Since the CPU 94, the storage 95, and the communication bus 96 in the service managing server 90 share the same essential form as the corresponding the CPU 31, the storage 32, and the communication bus 33 in the multifunction peripheral 10, a description of these components will not be repeated. The communication interface 92 is an interface for communicating with an external apparatus. Specifically, the communication interface 92 can communicate with the web server 70, the device information collecting server 90, and the service-providing apparatus 110.

As shown in FIG. 6(A), the data storage area 95B can store a service category list configured to store a plurality of service category records. Each service category record includes a service ID and a category in association with each other. The service ID in the service category list is the same information described above.

Categories are information indicating the category to which the service identified by the service ID belongs. Categories may be numbers, for example, specifying a translation service, printing management service, automatic consumable ordering service, and the like. Hence, categories are examples of types of services.

As shown in FIG. 6(B), the data storage area 95B can store a registered service list configured to store a plurality of registered service records. Each registered service record includes first user ID, device ID, service ID, service registration date, and authentication information in association with one another. The first user ID, the device ID, and the service ID in the registered service record are the same as information described above. The authentication information is issued by the service-providing apparatus 110.

As shown in FIG. 6(C), the data storage area 95B can store a service availability list configured to store a plurality of service availability records. Each service availability record includes, in association with one another, a model name, and availability information for each service identified by a service ID. The model name in the service availability record is the same as information described above.

Service availability information is information indicating whether a service, such as the service identified as Service A, is available to a multifunction peripheral 10 having the specified model name.

Service-Providing Apparatus 110

The service-providing apparatus 110 provides services to the users of multifunction peripherals 10. The service-providing apparatus 110 is accessible over the Internet and provides a variety of services in response to requests from the multifunction peripherals 10 and the information processing apparatus 50, or the web server 70, the device information collecting server 80, and the service managing server 90. The service-providing apparatus 110 may provide just a single service or may provide a plurality of services. Services provided by the service-providing apparatus 110 are identified by the service IDs described above.

As shown in FIG. 3(C), the service-providing apparatus 110 includes a communication interface 112, a CPU 114, a storage 115, and a communication bus 116. Since the CPU 114, the storage 115, and the communication bus 116 in the service-providing apparatus 110 share the same essential form as the corresponding the CPU 31, the storage 32, and the communication bus 33 in the multifunction peripheral 10, a description of these components will not be repeated. The communication interface 112 is an interface for communicating with an external apparatus. Specifically, the communication interface 112 can communicate with the information processing apparatus 50, the web server 70, the service managing server 90.

The service-providing apparatus 110 according to the embodiment provides a translation service, for example. More specifically, the service-providing apparatus 110 receives scan data generated by the scanner 12 from the multifunction peripheral 10 and converts the character string of a first language (English, for example) included in the scan data to a character string in a second language (Japanese, for example) having essentially the same content. The converted data that includes the character string in the second language will be called "translated data." The service-providing apparatus 110 then instructs the multifunction peripheral 10 to print the translated data. This translation service may be configured of a plurality of services. For example, some possible services are a service instructing the user to upload image data including the desired character string to be translated, and a service instructing the user to download the translated data. The service ID for this translation service in the embodiment is "Service A." Hereinafter, services that the service-providing apparatus 110 provides are referred to as "specific services".

The specific services provided by the service-providing apparatus 110 are not limited to the above example. The service-providing apparatus 110 may provide a service for managing the status of multifunction peripherals 10, a service that allows the user to view the status of multifunction peripherals 10 via the information processing apparatus 50, a service that sends reports to the user of a multifunction peripheral 10 specifying the status of the multifunction peripheral 10, a service that controls the multifunction peripherals 10 to execute printing operations on news image data that includes desired news, and a service for delivering supplies required for using the multifunction peripheral 10 to the user of the same, for example.

As shown in FIG. 7, the service-providing apparatus 110 can store a service management record configured to include a plurality of service management records. Each management records includes a second user ID, user information, a service ID, a service registration date, authentication information, and service settings information in association with one another.

The second user ID serves to identify the user of the service-providing apparatus 110 specified in the corresponding user information. Each service management record is uniquely identified by a second user ID. The second user ID is information specifying that the service-providing apparatus 110 has authenticated the user of the multifunction peripheral 10 and indicates that the user has authorization to access the service-providing apparatus 110. The second user ID may include a combination of a user ID and password.

The user information, the service ID, the service registration date, and the authentication information are the same as the information described above.

The service settings information is information specifying user-selected settings regarding services provided by the service-providing apparatus 110.

The service-providing apparatus 110 uses the above information when providing services to the user or when billing the user for the services provided, for example. As a specific example, the service-providing apparatus 110 may send reports or supplies to the address associated with the second user ID on the basis of information collected from the multifunction peripheral 10 via the device information collecting server 80. As another example, the service-providing apparatus 110 may complete a payment transaction using the credit card associated with the second user ID for the cost of services provided through the multifunction peripherals 10 associated with the second user ID.

Operations of the Communication System 100

The operations of the communication system 100 according to the embodiment will be described with reference to FIGS. 8 through 21. The description of the embodiment focuses on processes performed by the web server 70, the device information collecting server 80, and the service managing server 90 for enabling the user of the multifunction peripheral 10 to access services provided by the service-providing apparatus 110. In the embodiment, the same user possesses the multifunction peripherals 10A and 10B and the information processing apparatus 50.

Figure 8:
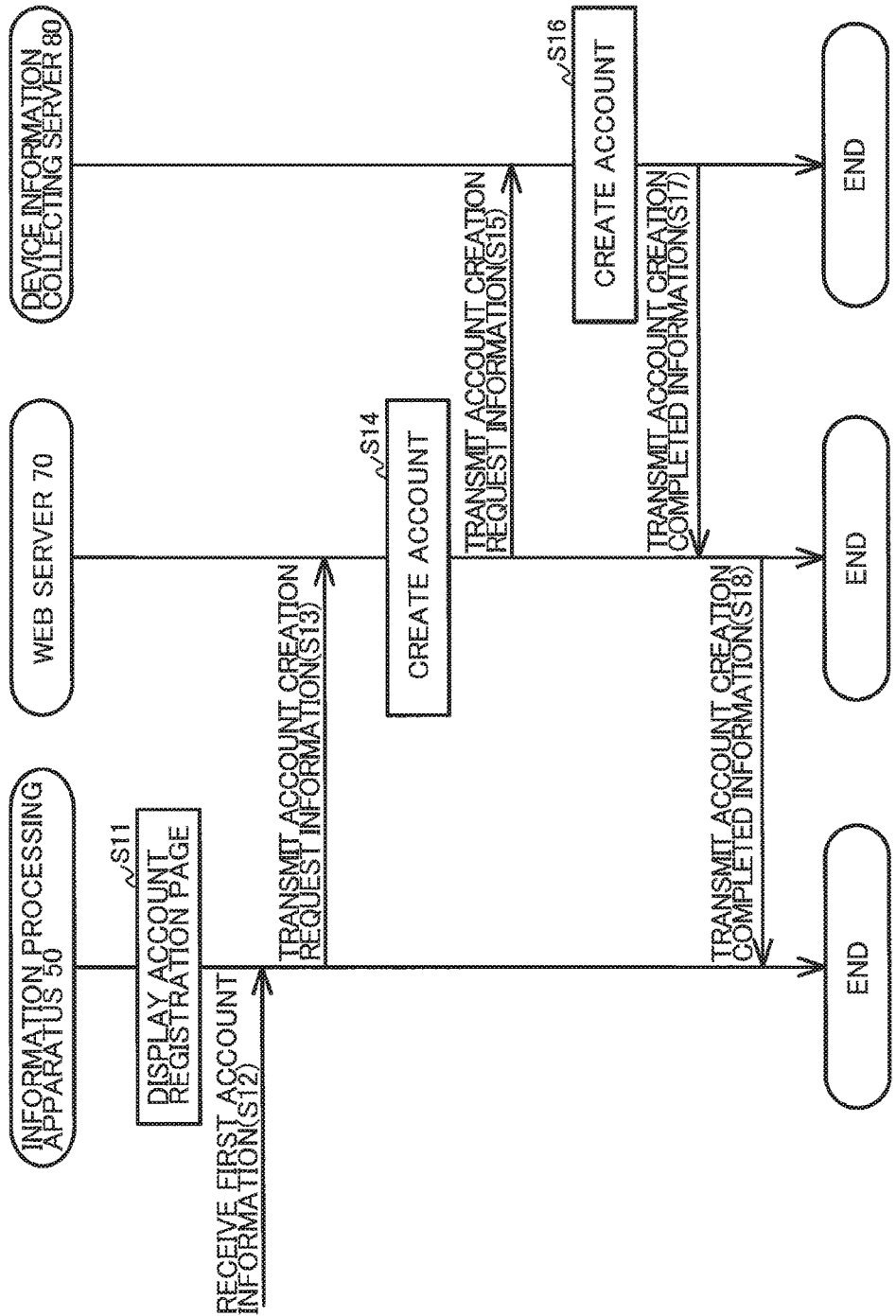
FIG. 8 is a flowchart for a process for registering a user account on the web server and the device information collecting server.

FIG. 8 shows steps in the process for registering a user account on the web server 70 and the device information collecting server 80. In S11 the control program 65 of the information processing apparatus 50 displays an account registration page on the display 53. The account registration page is a page in which the user of the multifunction peripheral 10A can register an account on the web server 70 and the device information collecting server 80. Here, the control program 65 issues a request to the web server 70 via the communication interface 55 for an HTML file defining the account registration page, receives the HTML file from the web server 70 in response to this request, and displays the account registration page based on this HTML file. The location of the HTML file defining the account registration page may be identified by a URL, for example.

While not shown in the drawings, the account registration page includes, as user information, text boxes for inputting for any arbitrary information such as the user's full name, address, telephone number, credit card number, and the user's desired first user ID including password (hereinafter referred to as the "first account information"); and a "Register" icon. In S12 the control program 65 receives the first account information and a user operation to select the "Register" icon via the operating interface 54.

Once the control program 65 has received input for the first account information and an operation to select the "Register" icon via the operating interface 54 (S12), in S13 the control program 65 transmits account creation request information to the web server 70 via the communication interface 55. Account creation request information is information for requesting that the web server 70 and the device information collecting server 80 create an account. The account creation request information includes the first account information received as input in S12.

In response to the account creation request information from the information processing apparatus 50 via the communication interface 72 (S13), in S14 the control program 78 of the web server 70 executes an account creating process. In the account creating process, the control program 78 verifies that a first user ID identical to the first user ID included in the first account information received in S13 is not already registered in the first account list and, if not, the control program 78 adds a first account record including the first user ID and user information to the first account list. In S15 the control program 78 transmits the account creation request information received from the information processing apparatus 50 to the device information collecting server 80 via the communication interface 72. However, while not shown in the drawings, if the control program 78 determines that a first user ID identical to the first user ID included in the first account information received from the information processing apparatus 50 is already registered in the first account list, the control program 78 transmits information to the information processing apparatus 50 via the communication interface 72 requesting that a different user ID be inputted.

In response to the account creation request information from the web server 70 via the communication interface 82 (S15), in S16 the control program 88 of the device information collecting server 80 executes the account creating process. In the account creating process, the control program 88 records a second account record including the first user ID and user information in the second account list on the basis of the account creation request information. In S17 the control program 88 transmits account creation completed information to the web server 70 via the communication interface 72. Since the first account list and second account list are associated with each other, first user IDs that can be registered in the first account list can also be registered in the second account list.

In response to the account creation completed information from the device information collecting server 80 via the communication interface 72 (S17), in S18 the control program 78 of the web server 70 transmits the account creation completed information to the information processing apparatus 50 via the communication interface 72.

In response to the account creation completed information from the web server 70 via the communication interface 55 (S18), the control program 65 of the information processing apparatus 50 displays a message on the display 53 indicating that account registration is complete.

Figure 9:
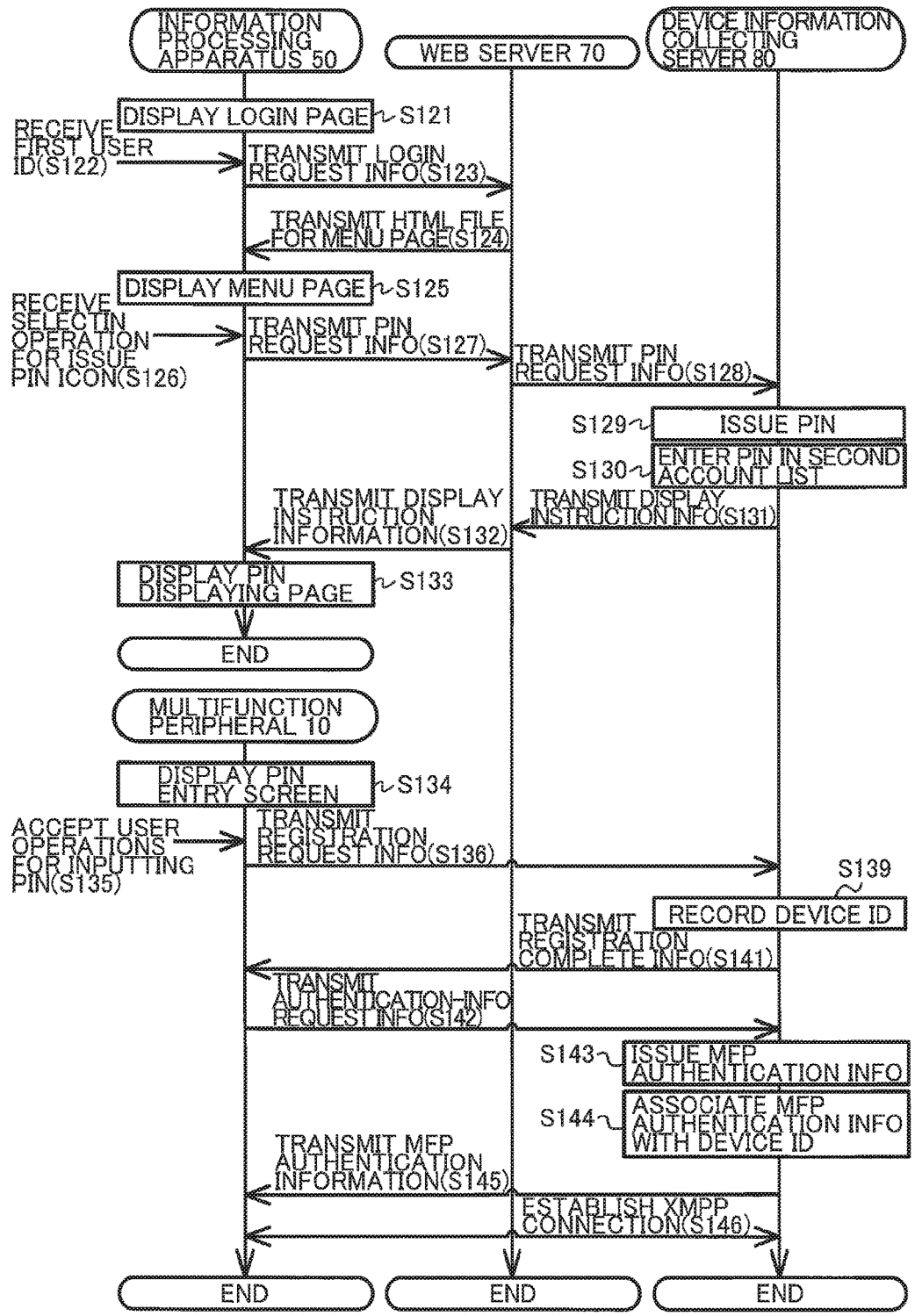
FIG. 9 is a flowchart for a process for registering device information in the second account list.

FIG. 9 shows steps in a process for registering the device ID, device name, and model name of the multifunction peripheral 10A (hereinafter referred to as the "device information") in the second account list. In S121 the control program 65 of the information processing apparatus 50 displays a login page on the display 53. The login page displayed in S121 is a page in which the user of the multifunction peripheral 10A can input the first user ID included in the first account information registered on the web server 70 and the device information collecting server 80.

While not shown in the drawings, the login page includes the message "Input your user ID and password and press the "Log in" icon," a text box for displaying the inputted user ID, a text box for displaying the inputted password, and a "Log in" icon. In S122 the control program 65 accepts user operations for inputting a user ID and password (hereinafter called the "first user ID"), and a user operation to select the "Log in" icon via the operating interface 54.

In response to input for the first user ID and an operation to select the "Log in" icon via the operating interface 54 (S122), in S123 the control program 65 transmits login request information to the web server 70 via the communication interface 55. The login request information is information for requesting that the information processing apparatus 50 be placed in a logged-in state. More specifically, the login request information is information for requesting the web server 70 to transmit a session ID. The login request information includes the first user ID that was received as input in S122.

In S123 the control program 78 of the web server 70 receives the login request information from the information processing apparatus 50 via the communication interface 72. The control program 78 confirms whether a first account record having the first user ID included in the login request information is registered in the first account list. When a first account record with the first user ID is registered in the first account list, the control program 78 issues a session ID and enters the session ID in the corresponding first account record. That is, when a first account record with the first user ID is registered in the first account list, the information processing apparatus 50 is placed in a logged-in state (or, is authenticated by the web server 70)

In S124 the control program 78 transmits an HTML file defining a menu page, and the issued session ID to the information processing apparatus 50 via the communication interface 72.

In response to the session ID from the web server 70 via the communication interface 55 (S124), the control program 65 stores the session ID in the data storage area 62B. In S125 the control program 65 displays a menu page on the display 53 based on the HTML file received with the session ID. While not shown in the drawings, the menu page includes an "Issue PIN" icon, and a "Display device list" icon. In S126 the control program 65 accepts operations for selecting an icon in the menu page via the operating interface 54.

When a selection operation for the "Issue PIN" icon is received (S126), in S127 the control program 65 transmits PIN request information to the web server 70 via the communication interface 55. The PIN request information is information for requesting the device information collecting server 80 to issue a PIN associated with the first user ID inputted in S122. The PIN request information includes the first user ID inputted in S122 and the session ID received in S124. The PIN is an example of password information.

In S127 the control program 78 receives the PIN request information from the information processing apparatus 50 via the communication interface 72. Here, when the web server 70 receives PIN request information that does not include a session ID issued by the web server 70 or receives PIN request information that includes an expired session ID, then the web server 70 transmits an HTML file defining the login page to the information processing apparatus 50 without advancing to the process beginning in S128. In other words, the web server 70 requests the information processing apparatus 50 to log in again when PIN request information received from the information processing apparatus 50 after web server 70 issued a session ID does not include a valid session ID. The web server 70 also issues a request to the information processing apparatus 50 to log in again even when receiving request information other than PIN request information from the information processing apparatus 50 after a session ID was issued, if the request information does not include a valid session ID. When the PIN request information received in S127 includes a valid session ID, in S128 the control program 78 transmits the PIN request information to the device information collecting server 80.

In response to the PIN request information from the web server 70, in S129 the control program 88 of the device information collecting server 80 issues a PIN, for example "012". In S130 the control program 88 enters the PIN issued in S129 in the second account record that includes the first user ID received in S128 with the PIN request information. In S131 the control program 88 transmits display instruction information to the web server 70 via the communication interface 82. Display instruction information is information for instructing the information processing apparatus 50 to display the PIN issued in S129 on the display 53. The display instruction information is an HTML file defining a PIN displaying page, for example. The display instruction information includes the PIN issued in S129.

In S132 the control program 78 relays the display instruction information to the information processing apparatus 50 via the communication interface 72. In response to the display instruction information from the web server 70 via the communication interface 55 (S132), in S133 the control program 65 displays a PIN displaying page on the display 53 on the basis of the display instruction information. While not shown in the drawings, the PIN displaying page includes the message "Input the PIN displayed here on the multifunction peripheral that will be using this service," and the PIN "012" that was issued in S129.

After seeing the PIN displaying page, the user performs a prescribed operation on the operating interface 24 of the multifunction peripheral 10A. In response to this operation via the operating interface 24, in S134 the control program 35 of the multifunction peripheral 10A displays a PIN entry screen on the display 23. While not shown in the drawings, the PIN entry screen includes the message "Please input the PIN," a text box in which the inputted PIN is displayed, and a "Send" icon. In S134 the control program 35 accepts user operations for inputting the PIN and a user operation to select the "Send" icon via the operating interface 24.

When the control program 35 receives input for the PIN "012" that was displayed on the display 53 of the information processing apparatus 50 and an operation to select the "Send" icon via the operating interface 24 (S135), in S136 the control program 35 transmits registration request information to the device information collecting server 80 via the communication interface 25. The registration request information is information for requesting the device information collecting server 80 to register various device-related information regarding the multifunction peripheral 10A in the second account list. The registration request information includes at least the PIN, and the device ID, device name, and model name of the multifunction peripheral 10A.

In response to registration request information from the multifunction peripheral 10A via the communication interface 82 (S136), the control program 88 confirms whether the PIN included in the registration request information is recorded in the second account list and, when the PIN is recorded, in S139 records the device ID, the device name, and the model name received in S136 in the second account list in association with the first user ID associated with this PIN. In S141 the control program 88 transmits registration complete information to the multifunction peripheral 10A via the communication interface 82. The registration complete information is information indicating that registration of the multifunction peripheral 10A is complete.

In response to the registration complete information from the device information collecting server 80 via the communication interface 25 (S141), in S142 the control program 35 transmits authentication-information request information to the device information collecting server 80 via the communication interface 25. The authentication-information request information is information for requesting the device information collecting server 80 to issue multifunction-peripheral authentication information that allows a multifunction peripheral 10 to access the device information collecting server 80. The authentication-information request information includes the device ID and the PIN whose input was received in S135.

In response to the authentication-information request information from the multifunction peripheral 10A via the communication interface 82 (S142), in S143 the control program 88 issues multifunction-peripheral authentication information. In S144 the control program 88 associates the multifunction-peripheral authentication information issued in S143 with the device ID included in the authentication-information request information received in S136. In S145 the control program 88 transmits the multifunction-peripheral authentication information issued in S143 to the multifunction peripheral 10A via the communication interface 82. Here, the multifunction-peripheral authentication information serves also as information for instructing that the XMPP connection is activated. Activation of the XMPP connection is instructed by the transmission of multifunction-peripheral authentication information.

In response to the multifunction-peripheral authentication information from the device information collecting server 80 via the communication interface 25 (S145), the control program 35 stores the multifunction-peripheral authentication information in the data storage area 32B. In S146 the control program 35 transmits XMPP connection request information to the device information collecting server 80 via the communication interface 25 in order to establish an XMPP connection between the multifunction peripheral 10A and the device information collecting server 80. The XMPP connection request information is information for requesting the establishment of an XMPP connection. The XMPP connection request information includes the multifunction-peripheral authentication information received in S145 and the device ID of the multifunction peripheral 10A.

In response to the XMPP connection request information from the multifunction peripheral 10A via the communication interface 82 (S146), the control program 88 sets the connection status in the connection status record of the connection status list that includes the device ID in the second account list associated with the multifunction-peripheral authentication information issued in S143 to "Connected." The control program 88 also stores the device ID, source global IP address, source TCP port number, and the like that were included in the XMPP connection request information received in S146 in the data storage area 85B as connection information. The source global IP address is the global IP address of the router 102A that relays the XMPP connection request information from the multifunction peripheral 10A to the Internet. The source TCP port number is the port number specified by the router 102A.

The process of S146 is implemented according to a procedure conforming with XMPP Over BOSH (Bidirectional-streams Over Synchronous HTTP). Note that an XMPP server may be located between the multifunction peripheral 10A and the device information collecting server 80. XMPP Over BOSH is a protocol for maintaining a near-constant connected state. However, the protocol for establishing a connection between the multifunction peripheral 10 and the device information collecting server 80 is not limited to XMPP Over BOSH, but may be one of a number of protocols known as connection-establishing protocols, continuous connection protocols, or connection-maintaining protocols. Note that the XMPP connection request information for XMPP Over BOSH is transmitted as an HTTP request in the hierarchy of HTTP.

The XMPP connection is established for transmitting requests from the device information collecting server 80 to the multifunction peripheral 10A via the router 102A. A request relayed through the router 102A from a device on the Internet side to a device on the LAN side using an XMPP connection is also called an "XMPP request." The transmission of a request from the device information collecting server 80 to the multifunction peripheral 10A is also called a "push notification," a "push transmission," and the like. This action is also called a "server push" and the like due to the fact that an HTTP server, such as the device information collecting server 80, is transmitting a request to the multifunction peripheral 10A. Note that an XMPP connection is timed out after a predetermined connection-maintaining interval has elapsed. The control program 35 reestablishes an XMPP connection with the device information collecting server 80 after a reconnection interval shorter than the connection-maintaining interval has elapsed, for example. Thus, the process in S146 is repeated at prescribed time intervals. In this way, the control program 88 can transmit arbitrary data to the multifunction peripheral 10A at an arbitrary timing using a recently established XMPP connection.

Figure 10:
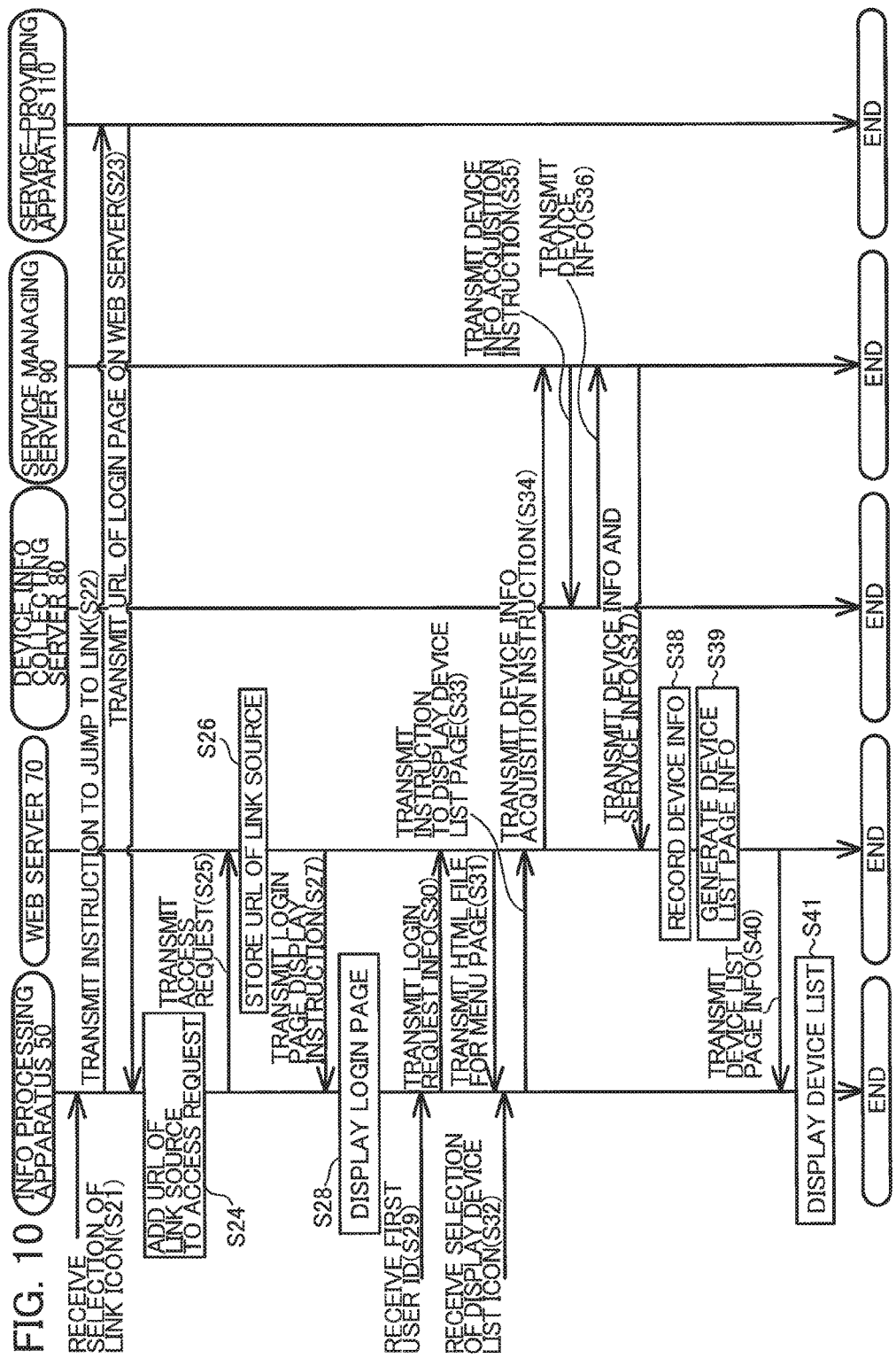
FIG. 10 is a flowchart for a process for displaying a device list page on the display of the information processing apparatus.

FIG. 10 shows steps in a process for displaying a device list page on the display 53 of the information processing apparatus 50. Here, the device list page lists the multifunction peripherals 10 associated with the first user ID.

The control program 65 of the information processing apparatus 50 displays a link page provided by the service-providing apparatus 110 on the display 53. The link page includes a link icon for accessing the web server 70. When the control program 65 receives an operation to select the link icon via the operating interface 54 (S21), in S22 the control program 65 transmits an instruction to the service-providing apparatus 110 through the communication interface 55 to jump to the link of the web server 70. The instruction for jumping to the link of the web server 70 is an instruction for logging in to the web server 70 through the service-providing apparatus 110.

In response to the instruction from the information processing apparatus 50 via the communication interface 112 to access the link of the web server 70 (S22), in S23 the control program 118 of the service-providing apparatus 110 transmits the URL of a login page on the web server 70 to the information processing apparatus 50 through the communication interface 112.

When the control program 65 receives the URL for the login page on the web server 70 from the service-providing apparatus 110 via the communication interface 55 (S23), in S24 the control program 65 adds, to an access request, a URL for the service-providing apparatus 110 which is the source of the received URL for the login page. The access request is information for requesting for the login page located at the received URL. The access request includes the URL received from the service-providing apparatus 110, a login page transmission instruction for the login page located at the received URL, and the URL of the service-providing apparatus 110 as link source information. In S25 the control program 65 transmits the access request to the web server 70 via the communication interface 55. The URL for the service-providing apparatus 110 is an example of address information for a web page on the service-providing apparatus or a web page provided by the service providing apparatus.

In response to this access request from the information processing apparatus 50 via the communication interface 72 (S25), in S26 the control program 78 of the web server 70 temporarily stores the URL of the service-providing apparatus 110 included in the access request as the link source information in the data storage area 75B. In S27 the control program 78 transmits a login page display instruction to the information processing apparatus 50 via the communication interface 72. The login page display instruction includes an html file defining a login page.

In response to the login page display instruction from the web server 70 via the communication interface 55 (S27), in S28 the control program 65 displays the login page on the display 53.

While not shown in the drawings, at the beginning of the process shown in FIG. 10, the control program 65 of the information processing apparatus 50 can display a link page provided by the web server 70 and having a link icon for accessing a login page on the web server 70 on the display 53. In this case, the control program 65 receives an operation to select the link icon for the login page via the operating interface 54 in place of the process of S21 described above. Thereafter, steps S22 and S23 are not executed, while in S24 the control program 65 adds, to an access request, the URL of the web server 70. The process from step S25 is identical to that described above. Note that in S26 the control program 78 temporarily stores the URL of the web server 70 as the link source information in the data storage area 75B. The URL of the web server 70 is an example of address information for a web page on the server or a web page provided by the server.

When the control program 65 receives input for a first user ID and a selection operation for the "Log in" icon via the operating interface 54 (S29), in S30 the control program 65 transmits login request information to the web server 70 via the communication interface 55. The login request information includes the first user ID received in S29.

In response to the login request information from the information processing apparatus 50 via the communication interface 72 (S30), the control program 78 of the web server 70 confirms whether a first account record having the first user ID that is included in the login request information is registered in the first account list. When such a first account record is registered in the first account list, the control program 78 subsequently issues a session ID and adds the session ID to the first account record. In other words, when the first account record is registered in the first account list, the control program 78 authenticates the information processing apparatus 50 in response to the user ID therefrom. In S31 the control program 78 transmits the session ID and an HTML file defining a menu page to the information processing apparatus 50 via the communication interface 72. Note that the session ID is added to all subsequent communications between the information processing apparatus 50 and the web server 70 when information is exchanged, unless otherwise specified.

When the control program 65 receives the HTML file defining the menu page from the web server 70 via the communication interface 55 (S31), the control program 65 stores the session ID received with the HTML file in the data storage area 62B and displays the menu page on the display 53. The process for displaying the menu page is identical to the process of S125 in FIG. 9. In S32 the control program 65 accepts a user operation to select the "Display device list" icon via the operating interface 54 and in S33 transmits an instruction to display the device list page to the web server 70 via the communication interface 55. The instruction to display the device list page includes the session ID received in S31. The instruction to display the device list page is an example of the display request that is for displaying device information.

In response to the instruction to display the device list page from the information processing apparatus 50 via the communication interface 72 (S33), the control program 78 identifies the first account record possessing the session ID that was included in the instruction to display the device list page and identifies the first user ID included in the first account record. In S34 the control program 78 transmits a device information acquisition instruction to acquire device information including the identified first user ID to the service managing server 90 via the communication interface 72.

The device information acquisition instruction is an instruction for acquiring information about the multifunction peripherals 10 associated with the first user ID for the user logged in to the web server 70. When the URL temporarily stored as the link source information in the data storage area 75B is the URL of the web server 70, the device information acquisition instruction sets the service acquisition type to all services. When the URL temporarily stored as the link source information is the URL of the service-providing apparatus 110, the device information acquisition instruction sets the service acquisition type to the service ID stored in the service list in association with this URL as the service URL (that is, the service ID in association with the specific service). The device information acquisition instruction is an instruction for acquiring the device IDs, device names, and model names needed to display the device list page for multifunction peripherals 10 that are registered in the first account list and second account list in association with the first user ID, and information about the services associated with the device IDs. The device information acquisition instruction includes the first user ID and the service acquisition type.

In response to the device information acquisition instruction from the web server 70 via the communication interface 92 (S34), in S35 the control program 98 of the service managing server 90 relays the device information acquisition instruction received from the web server 70 to the device information collecting server 80 via the communication interface 92.

When the control program 88 of the device information collecting server 80 receives the device information acquisition instruction from the service managing server 90 via the communication interface 82 (S35), in S36 the control program 88 reads the device IDs, device names, and model names stored in the second account list in association with the first user ID, reads the connection statuses stored in the connection status list in association with the read device IDs, and transmits, as device information, the read device IDs, the read device names, the read model names, and the read connection statuses to the service managing server 90 via the communication interface 82.

Next, the control program 98 receives the device information from the device information collecting server 80 via the communication interface 92 (S36). When the service acquisition type included in the device information acquisition instruction is "all services," the control program 98 reads the service IDs from the registered service list (FIG. 6(B)) for all the services associated with (1) the device IDs included in the device information received from the device information collecting server 80 and (2) the first user ID that is in a logged-in state. The control program 98 also reads the service IDs of services that are available to apparatuses with the model names included in the device information from the service availability list (FIG. 6(C)). The control program 98 also reads the categories in the service category list associated with the service IDs read from the service availability list and the registered service list. The control program 98 then configures service information to include the service IDs, and service registration dates, read above, as well as the available service IDs and categories of the available services.

When the service acquisition type included in the device information acquisition instruction is a service ID, the control program 98 reads all the service IDs and service registration dates in the registered service list that are associated with (1) the device IDs included in the device information received from the device information collecting server 80 that are registered in the registered service list (FIG. 6(B)), and (2) the first user ID in the logged-in state. The control program 98 also reads the service IDs of services that are available to apparatuses with the model names included in the device information from the service availability list (FIG. 6(C)). The control program 98 configures service information to include the service IDs, and service registration dates of the registered services read above, as well as the available service IDs of the available services.

In S37 the control program 98 transmits the device information and service information to the web server 70 via the communication interface 92.

When the control program 78 receives the device information and service information from the service managing server 90 via the communication interface 72 (S37), in S38 the control program 78 records the device information and the service information in the first account list. In S39 the control program 78 generates device list page information based on the device information and the service information received from the service managing server 90. The device list page information is information described in HTML, for example. The process for generating device list page information will be described later in greater detail. In S40 the control program 78 transmits the device list page information to the information processing apparatus 50 via the communication interface 72.

In response to the device list page information from the web server 70 via the communication interface 55 (S40), in S41 the control program 65 displays a device list page on the display 53 based on the device list page information received from the web server 70.

Figure 11:
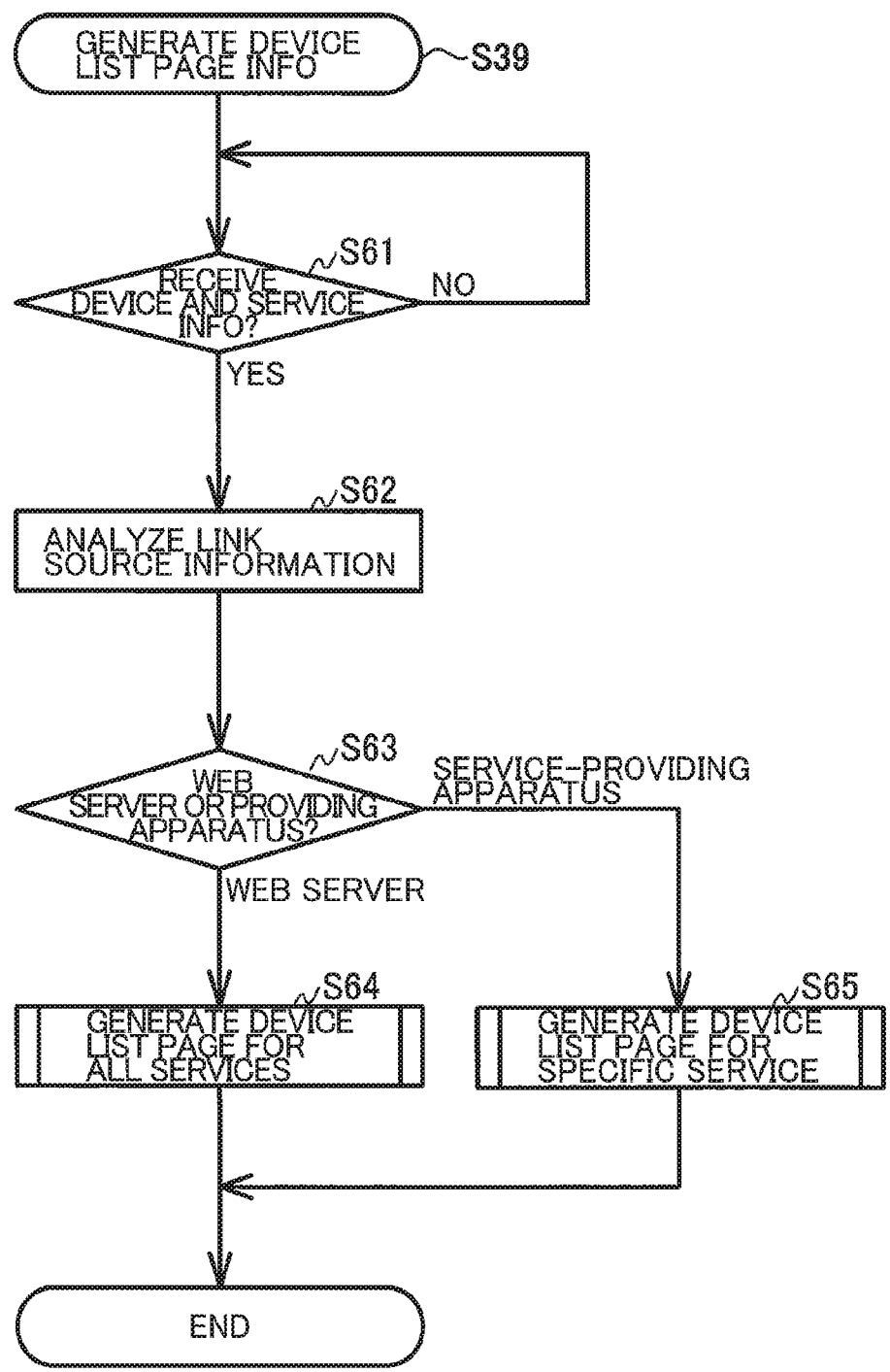
FIG. 11 is a flowchart of a process for generating a device list page information.

FIG. 11 shows steps in the process for generating device list page information described in S39 of FIG. 10. In S61 of FIG. 11, the control program 78 of the web server 70 repeatedly determines whether device information and service information has been received from the service managing server 90 via the communication interface 72 while such information has not been received (S61: NO). When the device information and the service information are received (S61: YES), in S62 the control program 78 analyzes the URL temporarily stored in the data storage area 75B as the link source information for the request to display the device list page.

In S63 the control program 78 references the service list (FIG. 4(A)) to determine whether the URL stored as the link source information is the URL of the web server 70 or the URL of the service-providing apparatus 110. Specifically, the control program 78 determines whether the service list registers the service URL matching the URL stored as the link source information. When there is the service URL matching the URL stored as the link source information in the service list, the control program 78 determines that the URL stored as the link source information is the URL of the service-providing apparatus 110. When there is no service URL matching the URL stored as the link source information in the service list, the control program 78 determines that the URL stored the link source information is the URL of the web server 70. The process in S63 is an example of the address information determining process.

When the control program 78 determines that the URL constituting the link source information is the URL of the web server 70 (S63: web server), in S64 the control program 78 executes a process to generate a device list page for all services, and subsequently ends the process for generating device list page information. The process for generating a device list page for all services will be described later.

On the other hand, when the URL stored as the link source information is the URL of the service-providing apparatus 110 (S63: service-providing apparatus), in S65 the control program 78 executes a process to generate a device list page for the specific service based on the service ID associated with the URL of the service-providing apparatus 110 in the service list, and subsequently ends the process for generating a device list page. The process for generating a device list page for the specific service will be described later.

Figure 12:
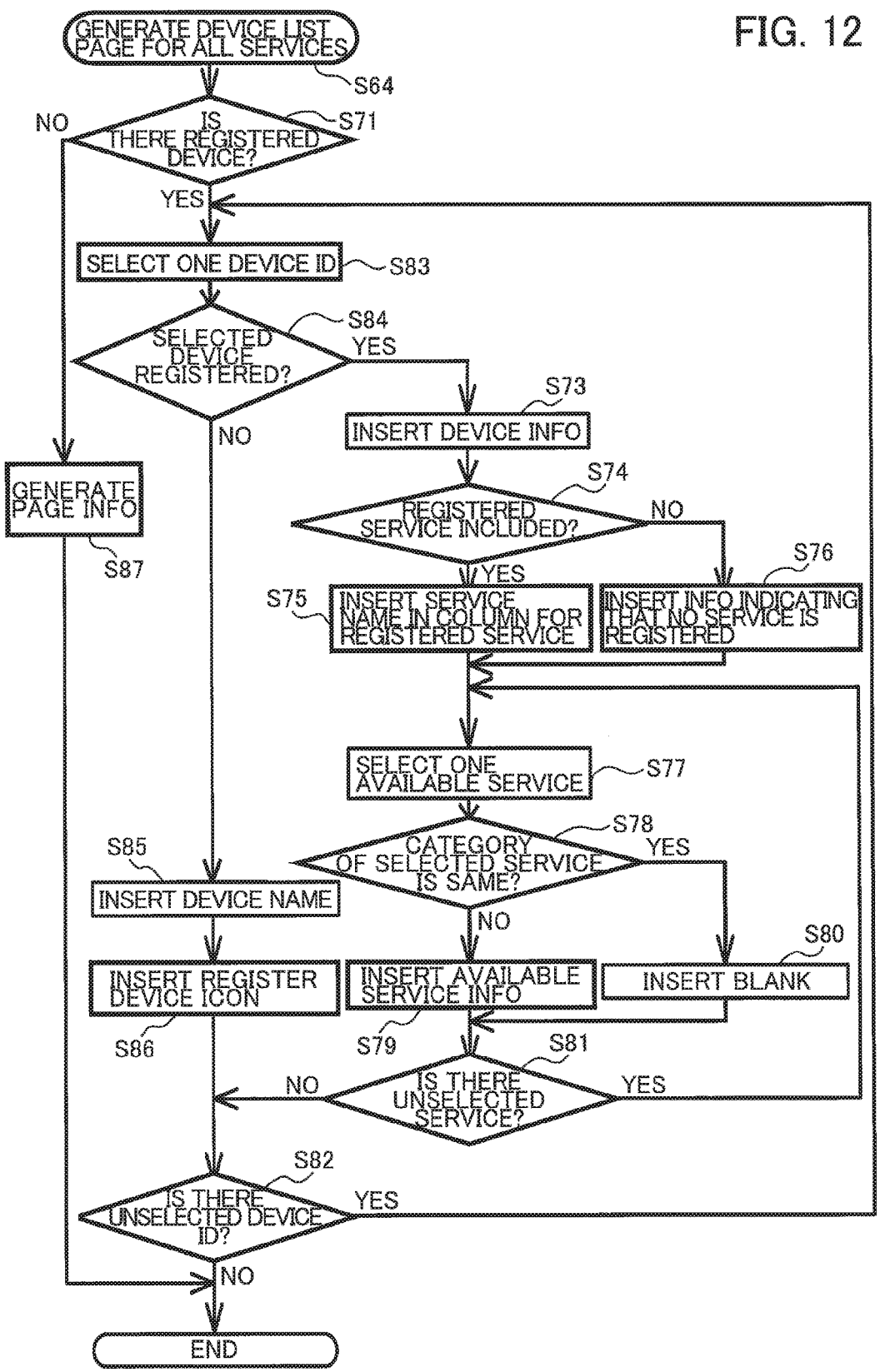
FIG. 12 is a flowchart for a process for generating a device list page for all services.

FIG. 12 shows the process for generating the device list page for all services described in S64 of FIG. 11. The process for generating the device list page for all services is executed using the device information and service information received in S37. In S71 of FIG. 12, the control program 78 of the web server 70 determines whether there are any device IDs in the first account list that are associated with the first user ID of the user currently logged in to the web server 70.

When no device IDs are associated with the first user ID (S71: NO), in S87 the control program 78 generates page information for a device registration page and subsequently ends the process for generating a device list page for all services. The device registration page is a page similar to the device list page shown in FIG. 19 in which only a "Register device" icon 131 is displayed, for example. By selecting the "Register device" icon 131, the user can initiate a process to store various information related to the multifunction peripheral 10 (the device ID, the device name, and the model name) on the device information collecting server 80. That is, the user can initiate the process beginning from S127 in FIG. 9.

When there are device IDs associated with the first user ID (S71: YES), in S83 the control program 78 selects one of the device IDs associated with the first user ID from the first account list.

In S84 the control program 78 determines whether the device information received in S37 includes the device ID selected in S83.

When the device ID is not included in the device information received in S37 (S84: NO), in S85 the control program 78 creates a new line on the device list page and inserts the device name and model name corresponding to the selected device ID in the new line. For example, the control program 78 inserts the device name "Printer 5" and the model name "MFP-E" in the device list page shown in FIG. 19.

In S86 the control program 78 inserts a "Register device" icon 132 in the newly created line. By selecting the "Register device" icon 132, the user can initiate a process to store various information related to the multifunction peripheral 10 (the device ID, the device name, and the model name) on the device information collecting server 80. That is, the user can initiate the process beginning from S127 in FIG. 9.

In S82 the control program 78 determines whether there remain any device IDs in the first account list associated with the first user ID that have not yet been selected.

When there are no more device IDs to select (S82: NO), the control program 78 ends the process for generating a device list page for all services.

However, when there remain unselected device IDs (S82: YES), the control program 78 returns to S83 and repeats the process described above.

On the other hand, when the selected device ID is included in the device information received in S37 (S84: YES), in S73 the control program 78 creates a new line on the device list page and inserts the device name and model name corresponding to the selected device ID in the new line.

In S74 the control program 78 determines whether service information for registered services associated with the device ID is included in the service information received in S37.

Figure 19:
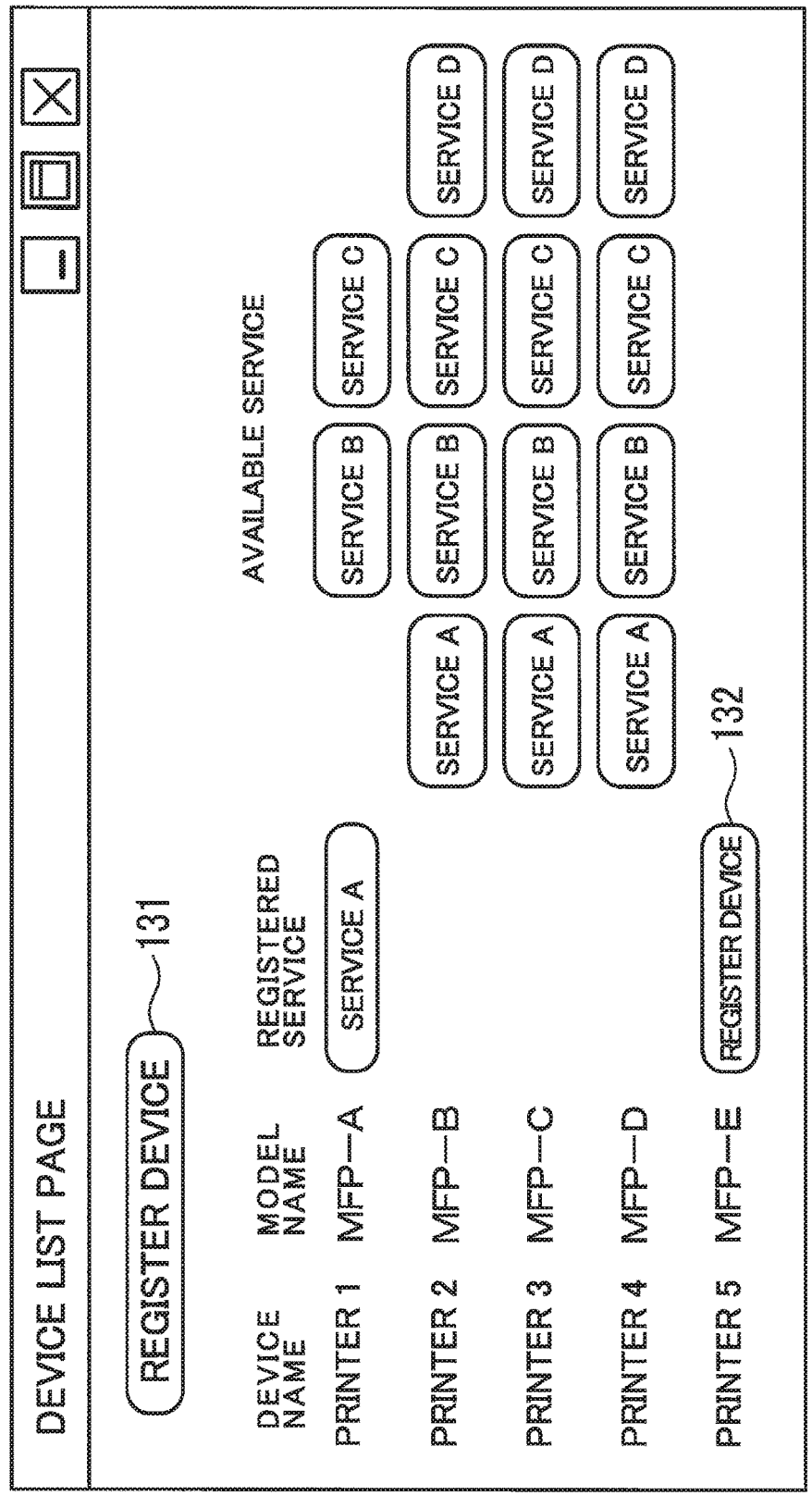
FIG. 19 is an example of a device list page displayed on the information processing apparatus.

When there is a registered service associated with the device ID (S74: YES), in S75 the control program 78 inserts the service name of the service in the newly created line of the device list page. In the example of FIG. 19, the control program 78 inserts "Service A" in the column for registered services of the device list page in the line having the device name "Printer 1" and the model name "MFP-A." This example assumes that a service name associated with the service ID is included in the service information. The display of "Service A" in the registered service column of the device list page is an example of the first information.

When the service information does not include any registered services associated with the device ID (S74: NO), in S76 the control program 78 inserts information, such as a blank, indicating that there are no registered services in the newly created line of the device list page. In the example of FIG. 19, the control program 78 has inserted a blank in the registered services column of the device list page in the line having device name "Printer 2" and model name "MFP-B."

When the service information received in S37 includes available services associated with the selected device ID, in S77 the control program 78 selects one of the available services.

In S78 the control program 78 determines whether the category associated with the service ID of the selected available service is identical to the category associated with the registered service ID. This step may be skipped when there are no registered services.

When the categories are not the same (S78: NO), in S79 the control program 78 inserts the service name of the selected available service in the newly created line of the device list page. In the example of FIG. 19, the control program 78 has inserted "Service A", as a service icon, in the available service column of the device list page and in the line having device name "Printer 2" and model name "MFP-B." The service icon "Service A" displayed in the available service column of the device list page is an example of the second information.

However, when the categories are the same (S78: YES), in S80 the control program 78 inserts a blank, for example, in the newly created line of the device list page for the selected available service.

In S81 the control program 78 determines whether there remain any unselected available services associated with the selected device ID in the service information received in S37.

When there remain available services that have not yet been selected (S81: YES), the control program 78 returns to S77 and repeats the process described above.

However, when there are no available services that have not been selected (S81: NO), the control program 78 advances to S82.

Figure 13:
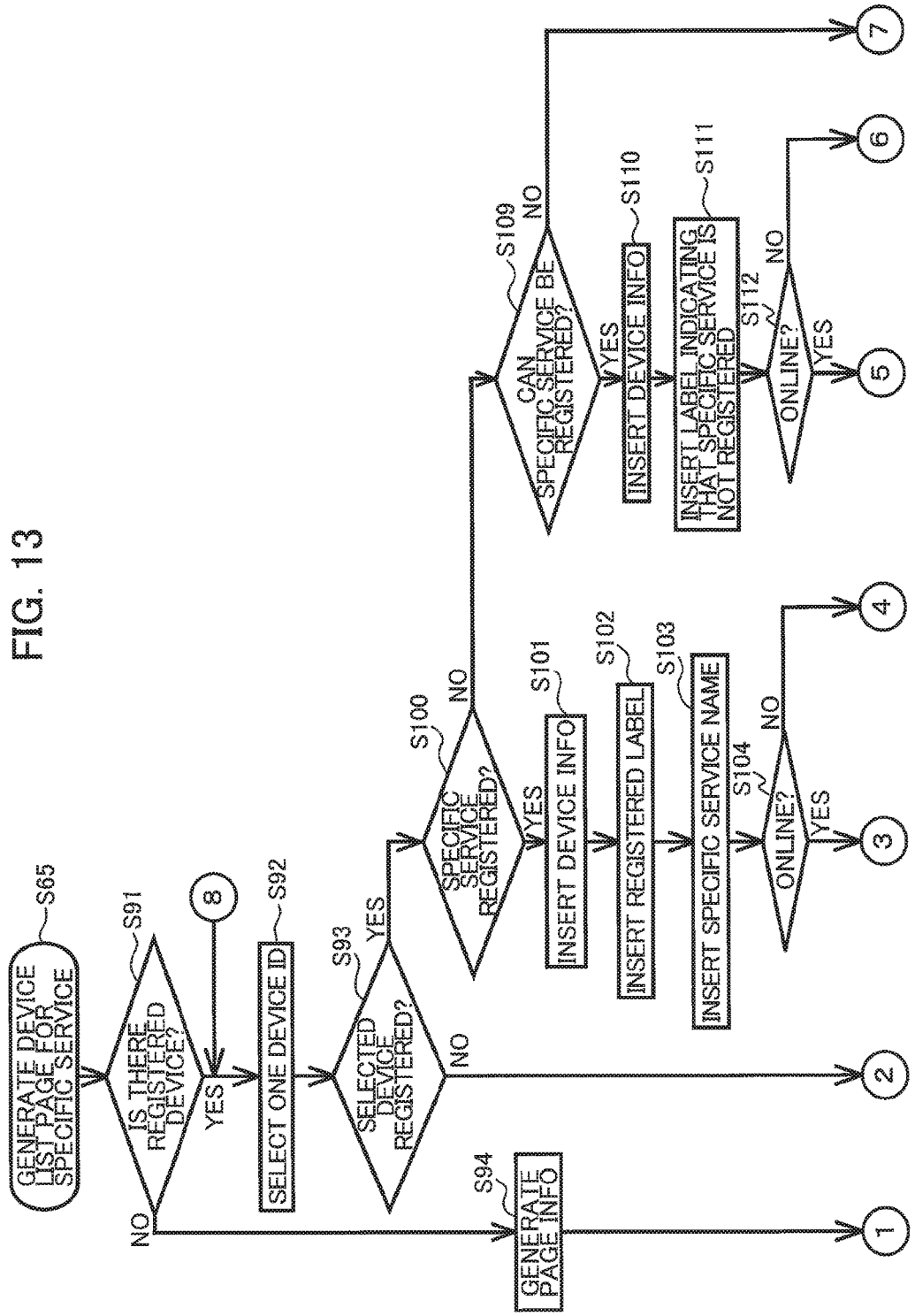
FIG. 13 is a flowchart for a part of a process for generating a device list page for a specific service.
Figure 14:
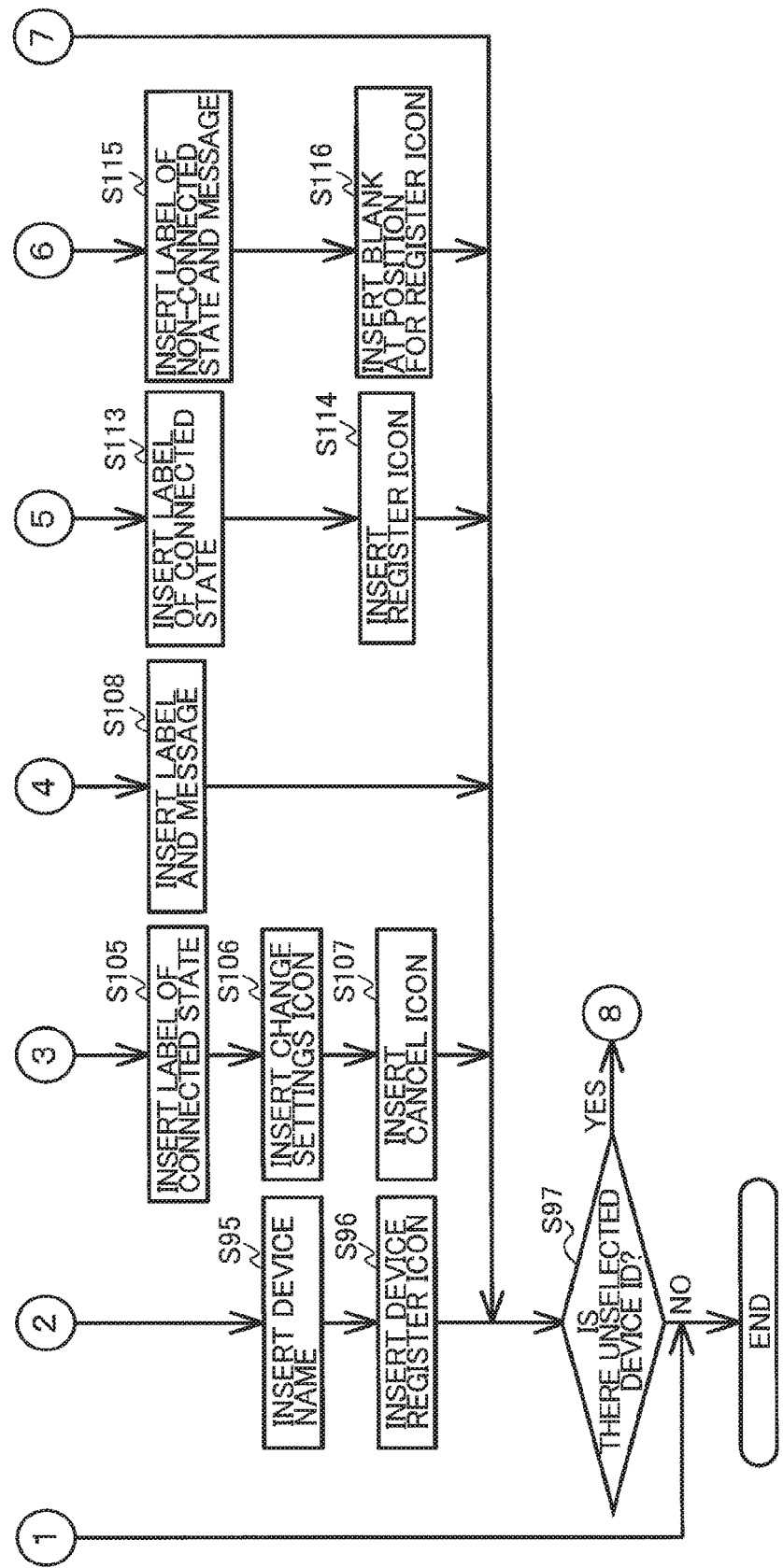
FIG. 14 is a flowchart for a remaining part of the process for generating a device list page for a specific service.

FIGS. 13 and 14 show the process for generating the device list page for a specific service described in S65 of FIG. 11. The process for generating the device list page for a specific service is executed using the device information and service information received in S37. In S91 of FIG. 13, the control program 78 of the web server 70 determines whether there are any device IDs in the first account list that are associated with the first user ID of the user logged in to the web server 70.

When no device IDs are associated with the first user ID (S91: NO), in S94 the control program 78 generates page information for the device registration page, and subsequently ends the process for generating a device list page for a specific service. For example, the control program 78 displays the device list page shown in FIG. 20 including only a "Register device" icon 141. By selecting the "Register device" icon 141, the user can initiate a process to store various information related to the multifunction peripheral 10 (the device ID, the device name, and the model name) on the device information collecting server 80. That is, the user can initiate the process beginning from S127 in FIG. 9.

On the other hand, when there are device IDs in the first account list associated with the first user ID (S91: YES), in S92 the control program 78 selects one of the device IDs associated with the first user ID from the first account list.

In S93 the control program 78 determines whether the device information received in S37 includes the selected device ID.

When the device ID is not included in the device information received in S37 (S93: NO), in S95 the control program 78 creates a new line on the device list page and inserts the device name and model name corresponding to the selected device ID in the new line. In the example of FIG. 20, the control program 78 inserts the device name "Printer 5" and model name "MFP-E" in the device list page.

In S96 the control program 78 inserts a "Register device" icon 142 in the newly created line. By selecting the "Register device" icon 142, the user can initiate a process to store various information related to the multifunction peripheral 10 (the device ID, the device name, and the model name) on the device information collecting server 80. That is, the user can initiate the process beginning from S127 in FIG. 9.

In S97 the control program 78 determines whether the first account list includes device IDs associated with the first user ID that have not yet been selected.

When there remain no more unselected device IDs (S97: NO), the control program 78 ends the process for generating the device list page for the specific service.

On the other hand, when unselected device IDs remain (S97: YES), the control program 78 returns to S92 and repeats the process described above.

When the device information received in S37 includes the selected device ID (S93: YES), in S100 the control program 78 determines whether the specific service identified by the URL of the link source information has been registered for the selected device ID in the service information received in S37.

When the specific service has been registered for this device ID (S100: YES), in S101 the control program 78 creates a new line on the device list page and inserts the device name and model name corresponding to the selected device ID in the new line.

In S102 the control program 78 inserts a registered designation (or label) indicating that the service ID is registered and the registration date for the service ID in the newly created line of the device list page on the basis of the service information. In the example of FIG. 20, the control program 78 inserts "Registered Jul. 2, 2015" in the line of the device list page having device name "Printer 1" and model name "MFP-A." The designation (or label) "Registered Jul. 2, 2015" provided in the registered service information column of the device list page is an example of the first information.

In S103 the control program 78 inserts the service name for the service ID in the newly created line of the device list page. In the example of FIG. 20, the control program 78 inserts "Service A" in the line of the device list page having device name "Printer 1" and model name "MFP-A."

In S104 the control program 78 determines whether the multifunction peripheral 10 having the device ID is in a connected state based on the connection status included in the device information received in S37.

When the multifunction peripheral 10 is in a connected state (S104: YES), in S105 the control program 78 inserts a designation (or label) indicating that the multifunction peripheral 10 is in a connected state in the newly created line of the device list page. In the example of FIG. 20, the control program 78 inserts the designation (or label) "Connected" in the connection status column in the line of the device list page having device name "Printer 4" and model name "MFP-D."

In S106 the control program 78 inserts a "Change settings" icon 143 in the newly created line of the device list page.

In S107 the control program 78 inserts a "Delete" icon 144 in the newly created line of the device list page and subsequently advances to S97 described above.

However, when the multifunction peripheral 10 is in a non-connected state (S104: NO), in S108 the control program 78 inserts a designation (or label) indicating that the multifunction peripheral 10 is not connected and a message prompting the user to check the device in the newly created line of the device list page, and subsequently advances to S97 described above. In the example of FIG. 20, the control program 78 inserts the message "Disconnected Please check the device" in the connection status column of the device list page for the line having device name "Printer 1" and model name "MFP-A." As a variation to this process, the control program 78 may advance to S106 after performing the process in S108.

On the other hand, when the specific service has not been registered for the selected device ID in the service information received in S37 (S100: NO), in S109 the control program 78 determines, on the basis of the service information, whether the specific service can be registered for the selected device ID, i.e., whether the specific service is available to the multifunction peripheral 10 identified by the device ID.

When the specific service is available (S109: YES), in S110 the control program 78 creates a new line on the device list page and inserts the device name and model name corresponding to the selected device ID in the new line.

In S111 the control program 78 inserts a label in the newly created line of the device list page indicating that the specific service has not been registered. In the example of FIG. 20, the control program 78 inserts the designation (or label) "Unregistered" in the line of the device list page having device name "Printer 2" and model name "MFP-B."

In S112 the control program 78 determines whether the multifunction peripheral 10 having the device ID is in a connected state based on the connection status included in the device information received in S37.

When the multifunction peripheral 10 is in a connected state "S112: YES), in S113 the control program 78 inserts a designation (or label) indicating that the multifunction peripheral 10 is in a connected state in the newly created line of the device list page.

In S114 the control program 78 inserts a "Register" icon 145 in the newly created line of the device list page. The "Register" icon 145 on the device list page is an example of the second information.

On the other hand, when the multifunction peripheral 10 is in a non-connected state (S112: NO), in S115 the control program 78 inserts a designation (or label) indicating that the multifunction peripheral 10 is in a non-connected state and a message prompting the user to check the connected state of the device in the newly created line of the device list page.

In S116 the control program 78 inserts a blank at the displaying position for the "Register" icon in the newly created line of the device list page and subsequently advances to S97 described above.

On the other hand, when the specific service is not available (S109: NO), the control program 78 advances directly to S97 described above.

When there are a plurality of specific services identified by the URL of the link source information, the control program 78 may performs the step 100 and the following step (S101-S116) for all the specific services. Specifically, after performing the step S107 or S108, the control program 78 determines whether the registration is checked in S100 for all the specific processes. When there remains unchecked specific process, the process returns to S100 for performing the determination for unchecked specific process. Further, after performing the step S114 or S116, the control program 78 determines whether the availability is checked in S109 for all the specific processes. When there remains unchecked specific process, the process returns to S109 for performing the determination for unchecked specific process. In this case, in S114 the control program 78 may add icon information about the specific service that is determined to be available in association with the "Register" icon 145.

Figure 15:
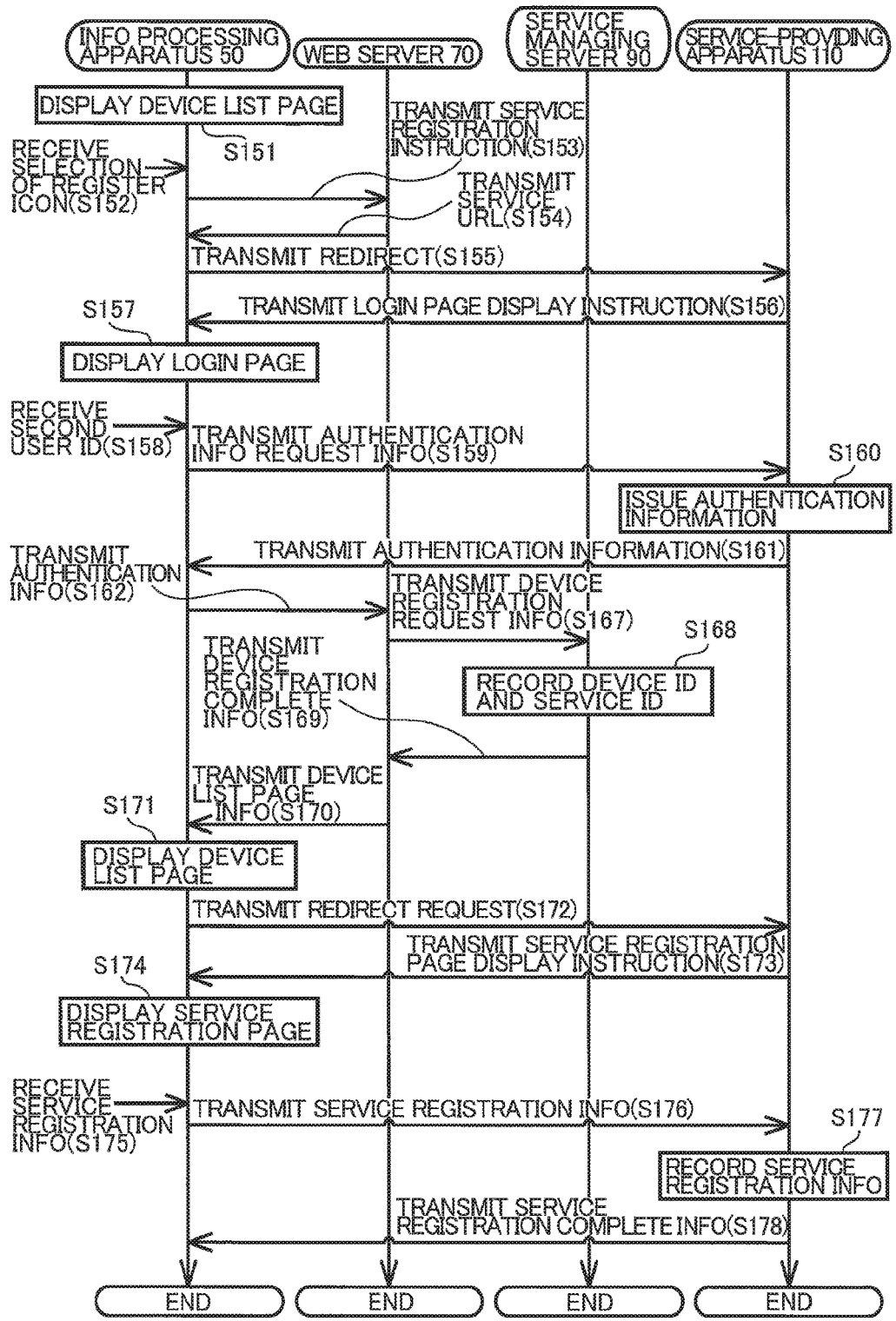
FIG. 15 is a flowchart for a process for registering for a service listed on the device list page.

FIG. 15 shows steps in a process for registering for a service listed on the device list page. In S151 of FIG. 15, the control program 65 of the information processing apparatus 50 displays the device list page on the display 53. The process for displaying the device list page is identical to that shown in FIG. 10. At this time, the information processing apparatus 50 is logged in to the web server 70 with the first user ID. In S152 the control program 65 accepts a user operation via the operating interface 54 for selecting the "Register" icon 145 in the device list page shown in FIG. 20. Note that the process in S152 may also be executed for accepting an operation performed in the device list page shown in FIG. 19 for selecting a service icon displayed as an available service. In this case, the process beginning from S152 is performed for registering for the service specified in the service icon.

When the control program 65 receives a selection operation for the "Register" icon 145 or a service icon via the operating interface 54 (S152), in S153 the control program 65 transmits a service registration instruction to the web server 70 via the communication interface 55. A service registration instruction is an instruction to register the service specified by the selected "Register" icon 145 or the service icon to the registered service list in association with the first user ID. The service ID correlated with the "Register" icon 145 may be identified by the icon information that is added when there is the plurality of specific services. The service registration instruction includes information identifying the device ID and the service ID that correspond to the "Register" icon 145 or the service icon.

When the control program 78 of the web server 70 receives the service registration instruction from the information processing apparatus 50 via the communication interface 72 (S153), the control program 78 identifies the service ID from the received service registration instruction and reads the service URL in the service list (FIG. 4(A)) that is associated with the identified service ID. In S154 the control program 78 transmits the service URL read from the service list to the information processing apparatus 50 via the communication interface 72. A callback URL is also attached to the transmission of the service URL. The callback URL is the URL of the web server 70 to which authentication information is transmitted. Here, the authentication information is issued by the service-providing apparatus in S160 described later. An identifier is also attached to the transmission of the service URL for identifying the user logged in to the web server 70. The user identifier identifies the first user ID. The control program 78 stores the received service registration instruction in association with the first user ID in the data storage area 75B.

In response to the service URL from the web server 70 via the communication interface 55 (S154), in S155 the control program 65 transmits a redirect request to the service-providing apparatus 110 via the communication interface 55 for redirecting to the service URL received from the web server 70. The user identifier sent in S154 is included in the redirect request.

In S155 the control program 118 of the multifunction peripheral 10 receives the redirect request from the information processing apparatus 50 via the communication interface 112. In S156 the control program 118 transmits a login page display instruction to the information processing apparatus 50.

When the control program 65 receives the login page display instruction from the service-providing apparatus 110 via the communication interface 55 (S156), in S157 the control program 65 executes a process for displaying the login page. The process for displaying the login page is identical to that described in S121 of FIG. 9 except that the login page of this case is for logging in to the service-providing apparatus 110. In S158 the control program 65 accepts a second user ID inputted via the operating interface 54 and in S159 transmits authentication information request information to the service-providing apparatus 110 via the communication interface 55. The authentication information request information includes instructions for requesting the issuance of the authentication information.

When the control program 118 receives the authentication information request information from the information processing apparatus 50 via the communication interface 112 (S159), in S160 the control program 118 confirms that the second user ID provided in the authentication information request information is included in the service management list of FIG. 7 and, when included, issues authentication information. The second user ID may be registered on the service management list through a following procedures. That is, the information processing apparatus 50 displays a user registration page on the display 53. The registration page may be transmitted from the service-providing apparatus 110. Through the user registration page, the user inputs the second user ID, and the user information, such as, password, and other user's information, via the operation interface 54. The information processing apparatus 50 transmits the user input the second user ID and the user information, and the service-providing apparatus 110 receives and registers the second user ID, and the user information in the service management list. In S161 the control program 118 transmits the authentication information issued in S160 and the user identifier included in the redirect request sent in S155 to the information processing apparatus 50 via the communication interface 112.

In response to this authentication information from the service-providing apparatus 110 via the communication interface 55 (S161), in S162 the control program 65 transmits the authentication information and the callback URL received in S154 to the web server 70 via the communication interface 55. The user identifier received in S161 is also included with the callback URL.

After receiving the authentication information and the callback URL from the information processing apparatus 50 via the communication interface 72 (S162), in S167 the control program 78 transmits device registration request information to the service managing server 90 via the communication interface 72. Here, the control program 78 identifies the first user ID based on the user identifier received in S162. The control program 78 then identifies the device ID and the service ID on the basis of the service registration instruction stored in the data storage area 75B in association with the first user ID. The first user ID, the device ID, and the service ID identified above and the authentication information are included in the device registration request information.

In response to the device registration request information from the web server 70 via the communication interface 92 (S167), in S168 the control program 98 of the service managing server 90 records the device ID, the service ID, and the authentication information in association with each other in the registered service list (FIG. 6(B)). The control program 98 also registers the present date as the service registration date. In S169 the control program 98 transmits device registration complete information to the web server 70 via the communication interface 92. The device registration complete information includes the registered service registration date.

In response to the device registration complete information from the service managing server 90 via the communication interface 72 (S169), in S170 the control program 78 transmits device list page information to the information processing apparatus 50 via the communication interface 72. The device list page information includes a link to a service registration page.

In response to the device list page information from the web server 70 via the communication interface 55 (S170), in S171 the control program 65 redisplays the device list page on the display 53. In S172 the control program 65 transmits a redirect request to the service-providing apparatus 110 via the communication interface 55 for redirecting to the service registration page.

When the control program 118 receives the redirect request from the information processing apparatus 50 via the communication interface 112 (S172), in S173 the control program 118 transmits a service registration page display instruction to the information processing apparatus 50 via the communication interface 112. The service registration page display instruction includes an HTML file defining a service registration page and a URL of the service providing apparatus 110. In response to the service registration page display instruction from the service-providing apparatus 110 via the communication interface 55 (S173), in S174 the control program 65 displays the service registration page on the display 53 as a popup window on the basis of the service registration page display instruction.

FIG. 21 shows an example of the service registration page. The service registration page in FIG. 21 includes four radio buttons corresponding to types of translation provided by a translation service, and a "Select" icon 151. The four types of translation in the example of FIG. 21 are translation from English to Japanese, translation from Japanese to English, translation from Chinese to Japanese, and translation from Japanese to Chinese. The user selects one of the four types of translation by choosing the corresponding radio button and confirms the selected translation type by pressing the "Select" icon 151.

In S175 the control program 65 receives service registration information inputted via the operating interface 54 and in S176 transmits the service registration information and the service registration date received in S170 to the service-providing apparatus 110 via the communication interface 55.

In response to the service registration information from the information processing apparatus 50 via the communication interface 112 (S176), in S177 the control program 118 records the service registration information in the service management list (FIG. 7) as service settings information. The control program 118 further records the service registration data in the service management list. In S178 the control program 118 transmits service registration complete information to the information processing apparatus 50 via the communication interface 112.

In response to this service registration complete information from the service-providing apparatus 110 via the communication interface 55 (S178), the control program 65 displays a service registration complete page on the display 53.

Figure 16:
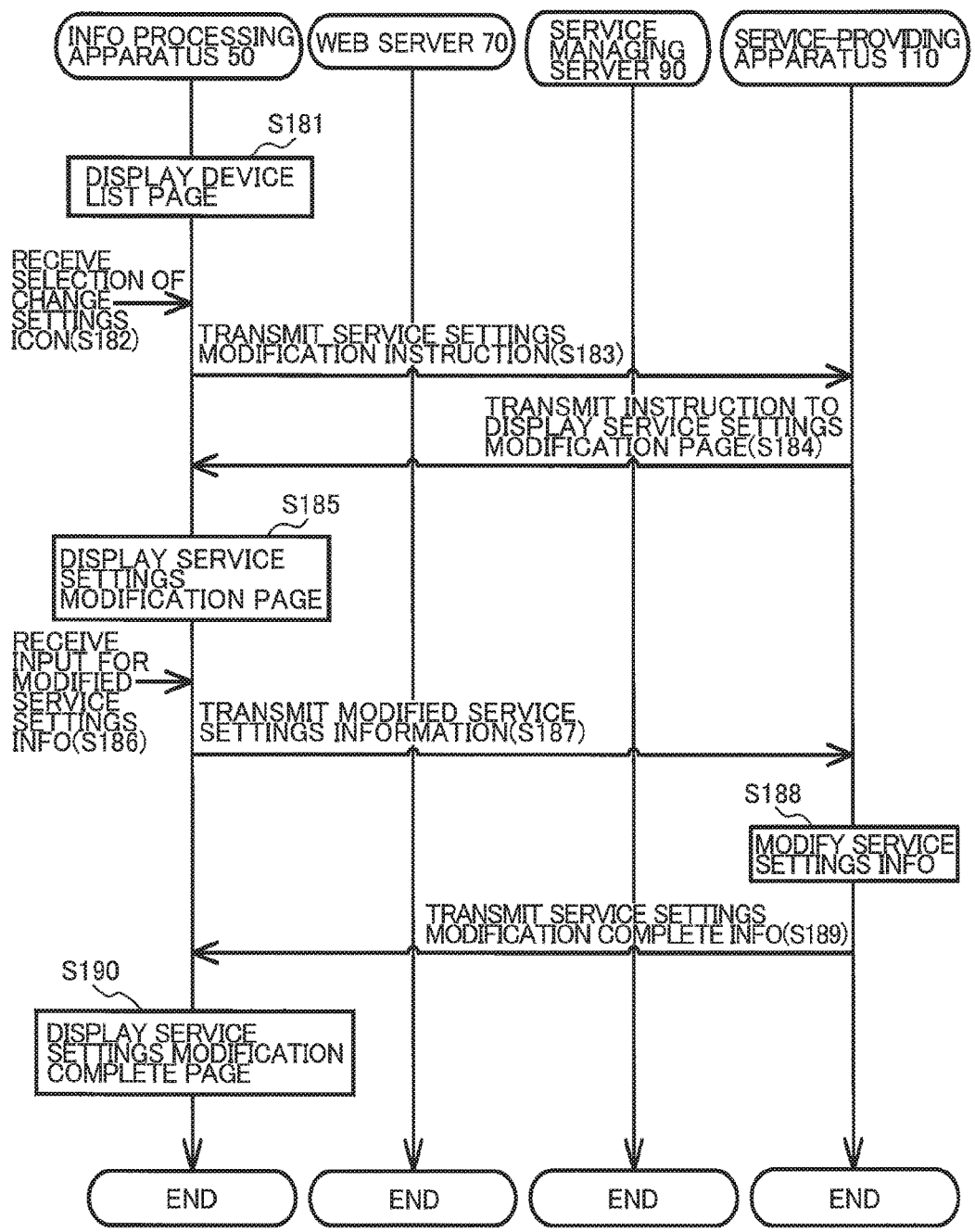
FIG. 16 is a flowchart for a process for modifying service settings through the device list page.

FIG. 16 shows steps in a process for modifying service settings through the device list page. In S181 of FIG. 16, the control program 65 of the information processing apparatus 50 displays the device list page on the display 53. At this time, the information processing apparatus 50 is logged in to the web server 70 with the first user ID. In addition, it will be assumed that the process from S151 to S170 shown in FIG. 15 has already been executed and that a device list page including a link to a service settings modification page has been displayed on the display 53. In S182 the control program 65 accepts user operations via the operating interface 54 for selecting the "Change settings" icon 143 on the device list page. The "Change settings" icon 143 is information for changing service settings.

In response to the operation to select the "Change settings" icon 143 via the operating interface 54 (S182), in S183 the control program 65 transmits a service settings modification instruction to the web server 70 via the communication interface 55. The service settings modification instruction is an instruction to modify service settings information. Here, the service settings information is already recorded in the service management list in association with the second user ID and is specified when the "Change settings" icon 143 is selected. The service settings modification instruction is request to redirect to the service settings modification page. That is, in response to the service settings modification instruction, the control program 78 sends request for prompting the information processing apparatus 50 to redirect to the service settings modification page on the service-providing apparatus 110 and to display the service settings modification instruction. The control program 78 identifies the service URL of the service ID for the service indicated by the service modification instruction from the service list and includes the specified URL as the location of the service settings modification page in the request.

In response to the redirect request from the information processing apparatus 50 via the communication interface 112 (S183), in S184 the control program 118 transmits an instruction to display the service settings modification page to the information processing apparatus 50 via the communication interface 112.

In response to this instruction to display the service settings modification page from the service-providing apparatus 110 via the communication interface 55 (S184), in S185 the control program 65 displays the service settings modification page on the display 53 as a popup window.

While not shown in the drawings, the service settings modification page is identical to the service registration page shown in FIG. 21, for example, but reflects the currently recorded settings content in the display. That is, one of the four types of translation is designated by a filled circle to show the currently recorded settings content, for example. The instruction to display the service settings modification page includes: a HTML file defining a service settings modification page and a URL of the service providing apparatus 110.

At this time, the user of the information processing apparatus 50 can select a different option (type of translation, in this example) in the service settings modification page using the operating interface 54, and modified service settings information will be inputted into the control program 65. Once the control program 65 has received input for the modified service settings information (S186), in S187 the control program 65 transmits the modified service settings information to the service-providing apparatus 110 via the communication interface 55.

In response to the modified service settings information from the information processing apparatus 50 via the communication interface 112 (S187), in S188 the control program 118 overwrites the service settings information currently recorded in the service management list (FIG. 7) with the modified service settings information. In S189 the control program 118 transmits service settings modification complete information to the information processing apparatus 50 via the communication interface 112.

When the control program 65 receives the service settings modification complete information from the service-providing apparatus 110 via the communication interface 55, in S190 the control program 65 displays a service settings modification complete page on the display 53.

While not shown in the drawings, a process for deleting a previously registered service from the device list page can be performed similarly to the process for registering for a service on the device list page or the process for modifying service settings through the device list page. To delete a service, the control program 65 accepts a user operation via the operating interface 54 for selecting the "Delete" icon 144 shown in FIG. 20. When deleting a service, the registered service record having the first user ID, the device ID, and the service ID for the service being deleted is deleted from the registered service list.

Figure 17:
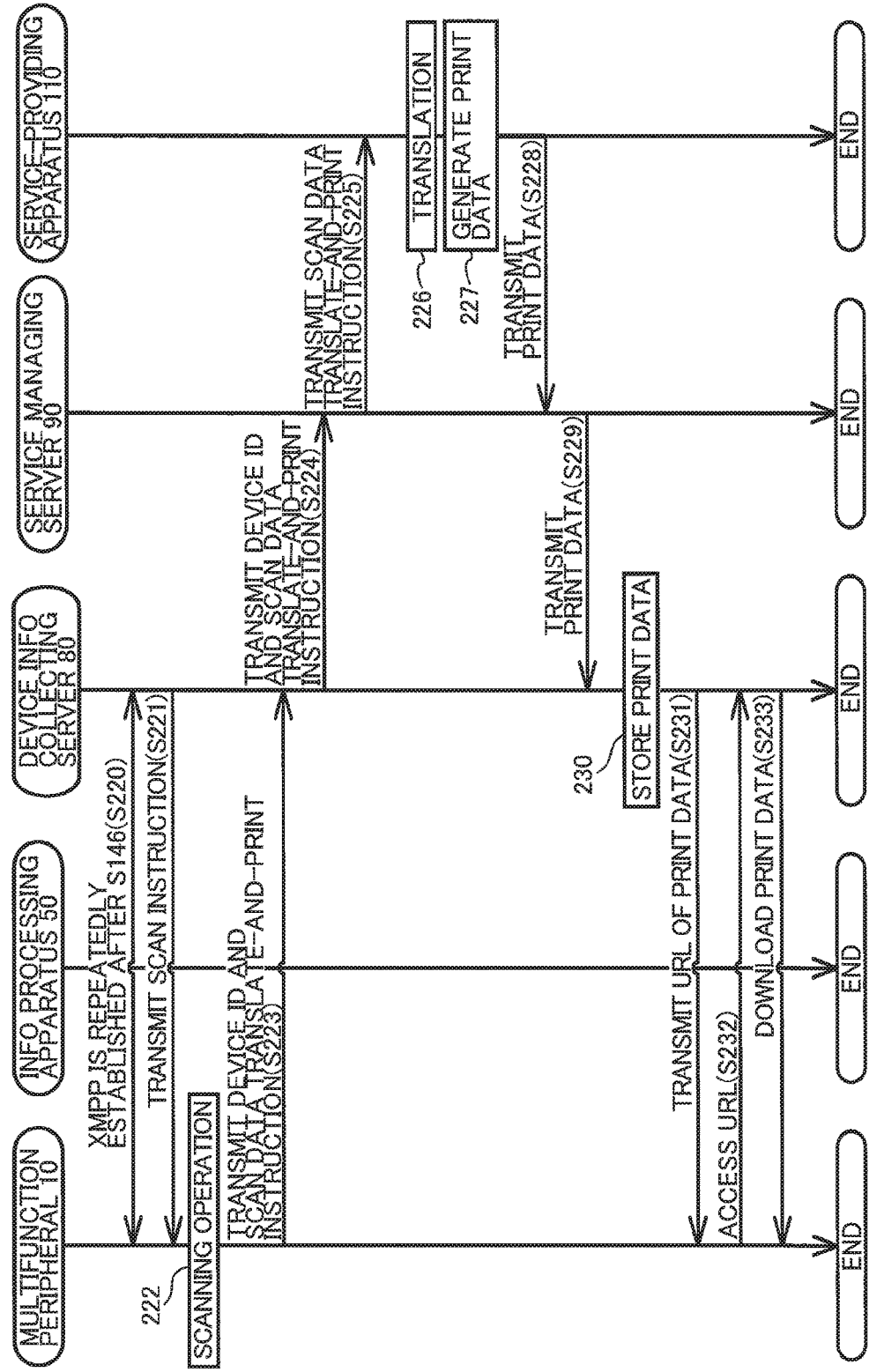
FIG. 17 is a flowchart for a process for implementing a translation service.

FIG. 17 shows steps in a process for implementing a translation service. Note that beginning from step S146 in FIG. 9, the XMPP connection between the multifunction peripheral 10 and the device information collecting server 80 is repeatedly re-established in the background. In S220 at the beginning of FIG. 17, connection information identifying the XMPP connection (source global IP address, source port number, etc.) is stored in association with the device ID in the data storage area 85B. While not shown in the drawings, the user can input a start instruction on the information processing apparatus 50 for initiating the translation service on the multifunction peripheral 10 with which the service is associated. When the user inputs a start instruction for the translation service, the start instruction is transmitted to the device information collecting server 80 via the web server 70 and the service managing server 90. The device ID of the multifunction peripheral 10 is included in the start instruction for the translation service.

In S221 the control program 88 of the device information collecting server 80 transmits a scan instruction via the communication interface 82 to the multifunction peripheral 10A as a push notification. In other words, the scan instruction is transmitted to the multifunction peripheral 10 assigned the device ID that is indicated by the service registration instruction. That is, the scan instruction can be transmitted to the multifunction 10 that is registered in response to the service registration instruction. Specifically, the control program 88 identifies connection information required for communicating with the multifunction peripheral 10A identified by the device ID received in S136 of FIG. 9. The control program 88 issues a push notification to the multifunction peripheral 10A through the TCP port having the port number included in the identified connection information.

When the control program 35 of the multifunction peripheral 10 receives the scan instruction from the device information collecting server 80 via the communication interface 25 (S221), in S222 the control program 35 controls the scanner 12 to execute a scanning operation on an original. In the scanning operation, the scanner 12 reads text recorded on the original in English, for example, and generates image data. In S223 the multifunction peripheral 10 transmits its device ID and a scan data translate-and-print instruction to the device information collecting server 80 via the communication interface 25 as an HTTP request. Although not shown in the drawing, the control program 88 immediately transmits an HTTP response (reply) specifying that the request was received to the multifunction peripheral 10 via the communication interface 82. The scan data translate-and-print instruction is an instruction to convert the scan data to text information, translate the text information into another language, and generate print data based on the translated text information. The scan data translate-and-print instruction includes an instruction to translate scan data, and image data (or the scan data) in which the text to be translated is recorded.

In response to the device ID and the scan data translate-and-print instruction from the multifunction peripheral 10 via the communication interface 82 (S223), in S224 the control program 88 relays the device ID and the scan data translate-and-print instruction to the service managing server 90 via the communication interface 82 as an HTTP request.

In response to the scan data translate-and-print instruction from the device information collecting server 80 via the communication interface 92 (S224), the control program 98 identifies the authentication information in the registered service list (FIG. 6(B)) stored in the data storage area 95B in association with the device ID received in S224. In S225 the control program 98 transmits the scan data translate-and-print instruction received from the device information collecting server 80 and the authentication information to the service-providing apparatus 110 via the communication interface 92.

In response to the scan data translate-and-print instruction and the authentication information from the service managing server 90 via the communication interface 112 (S225), the control program 118 of the service-providing apparatus 110 executes an optical character recognition (OCR) process on the scan data received from the service managing server 90 to convert the image data to text data. The control program 118 identifies the service settings information from the authentication information received in S225 and the service management list. In S226 the control program 118 translates the English text represented by the text data to Japanese text according to the service settings information. In S227 the control program 118 generates print data for printing the translated text. In S228 the control program 118 transmits the generated print data to the service managing server 90 via the communication interface 112.

In response to the print data from the service-providing apparatus 110 via the communication interface 92 (S228), in S229 the control program 98 relays this print data to the device information collecting server 80 via the communication interface 92.

In response to the print data from the service managing server 90 via the communication interface 82 (S229), in S230 the control program 88 temporarily stores this print data in the data storage area 85B. In S231 the control program 88 transmits a URL specifying a location of the print data to the multifunction peripheral 10 via the communication interface 82 in the form of a push notification.

In response to the URL for the print data from the device information collecting server 80 via the communication interface 25 (S231), in S232 the control program 35 accesses the URL via the communication interface 82 and in S233 receives the print data in a file specified by the URL from the device information collecting server 80 via the communication interface 82. Subsequently, the control program 35 controls the printer 11 to print the print data.

Figure 18:
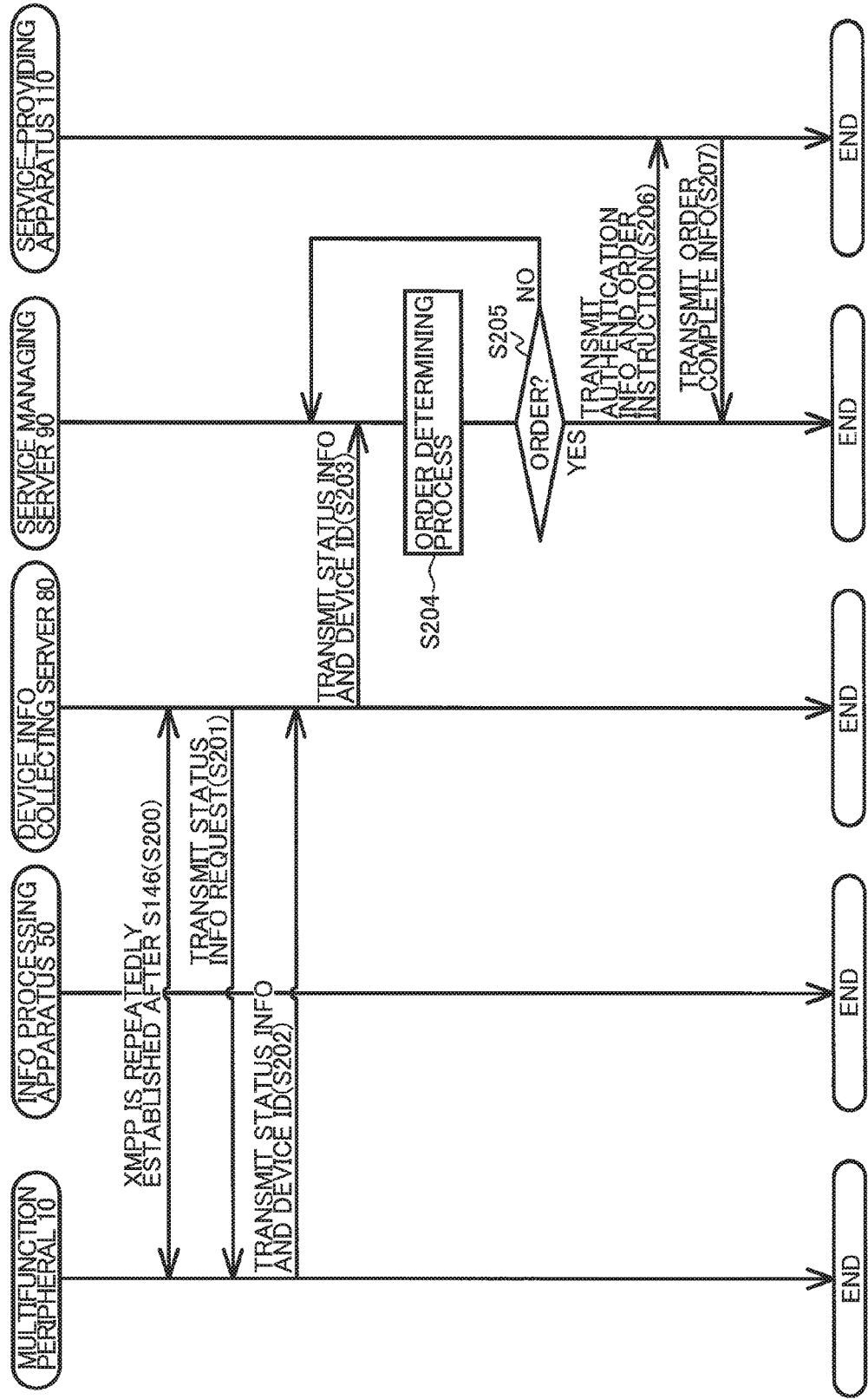
FIG. 18 is a flowchart for a process for implementing a consumable ordering service.

FIG. 18 shows steps in a process for implementing a consumable ordering service. In S200 of FIG. 18, an XMPP connection has already been established between the multifunction peripheral 10 and the device information collecting server 80. In S201 the control program 88 of the device information collecting server 80 transmits a status information request to the multifunction peripheral 10 via the communication interface 82 in the form of a push notification. The status information includes information related to the degree of consumption of the consumable. For example, information on the degree of consumption of a consumable may be information indicating the amount of residual ink in an ink cartridge. The status information request is a request to transmit the status information.

In response to the status information request from the device information collecting server 80 via the communication interface 25 (S201), in S202 the control program 35 of the multifunction peripheral 10 transmits the status information and its device ID to the device information collecting server 80 via the communication interface 25. In other words, the status information is transmitted to the multifunction peripheral 10 assigned with the device ID that is indicated by the service registration instruction. That is, the status information can be transmitted to the multifunction 10 that is registered in response to the service registration instruction.

In response to the device ID and the status information from the multifunction peripheral 10 via the communication interface 82 (S202), in S203 the control program 88 relays the device ID and the status information received from the multifunction peripheral 10 to the service managing server 90 via the communication interface 82.

In response to the device ID and the status information from the device information collecting server 80 via the communication interface 92 (S203), in S204 the control program 98 of the service managing server 90 executes an order determining process. The order determining process is a process for determining whether a new consumable should be ordered on the basis of the degree of consumption of the consumable specified by the status information received in S203. When the control program 98 determines not to order a consumable (S205: NO), the control program 98 returns to S203 to receive the next status information from the device information collecting server 80 via the communication interface 92. When the control program 98 determines that a consumable should be ordered (S205: YES), the control program 98 identifies the model name of the multifunction peripheral 10 based on the device ID received in S203 and selects the consumable product suited to the model name. The control program 98 also identifies the authentication information in the registered service list (FIG. 6(B)) stored in the data storage area 95B in association with the device ID. In S206 the control program 98 transmits the authentication information and an order instruction to the service-providing apparatus 110 via the communication interface 92. The order instruction includes the model number of the consumable product.

When the control program 118 of the service-providing apparatus 110 receives the authentication information and order instruction from the service managing server 90 via the communication interface 112 (S206), the control program 118 issues a notification through e-mail, for example, to notify the service provider of the order instruction that includes the model number of the consumable product. In response to the notification of this order instruction, the service provider ships the ordered product to the address specified in the user information. Further, in response to the authentication information and the order instruction from the service managing server 90 via the communication interface 112 (S206), in S207 the control program 118 transmits order complete information to the service managing server 90 via the communication interface 112.

Subsequently, the control program 98 receives the order complete information from the service-providing apparatus 110 via the communication interface 92 (S207).

Operational Advantages of the Embodiment

In the embodiment described above, when the web server 70 receives an access request from the information processing apparatus 50 and receives an instruction to display the device list page from the information processing apparatus 50 that was authenticated by the web server 70 using the first user ID, the web server 70 determines whether the URL of the web page included with the access request indicates the service-providing apparatus 110 or the web server 70. When the URL indicates the service-providing apparatus 110, the web server 70 transmits to the information processing apparatus 50 the device IDs of the multifunction peripherals 10 that satisfy a condition that the device IDs are stored in association with the first user ID used by the information processing apparatus 50 for authentication and a condition that the service IDs associated with the device IDs match the service ID of the service-providing apparatus 110 specified by the URL (the specific services).

This procedure enables the information processing apparatus 50 to display a list of the multifunction peripherals 10 associated with the first user ID and associated with the service provided by the service-providing apparatus 110 that is the source of the access request (or, that is designated by the link source information). Therefore, the user can easily learn what multifunction peripherals 10 can use specific services.

When determining that the URL for the source of the access request indicates the web server 70, the control programs 78, 88, and 98 transmit device information to the information processing apparatus 50 for all device IDs stored in the data storage area 75B in association with the first user ID of the user logged in to the web server 70.

Hence, when the web server 70 is the source of an access request, the user can view information for all multifunction peripherals 10 associated with the first user ID.

When determining that the URL constituting the access request source indicates the service-providing apparatus 110, the control programs 78, 88, and 98 determine whether any device IDs stored in the data storage area 75B are associated with a service ID for a service that can be additionally associated with the service provided by the service-providing apparatus 110. Subsequently, the control programs 78, 88, and 98 transmit device information for any device IDs yielding a positive determination to the information processing apparatus 50.

Accordingly, when the service-providing apparatus 110 is the source of an access request, the user can view multifunction peripherals 10 that are associated with the first user ID in the logged-in state and that can be associated with the service provided by the service-providing apparatus 110 constituting the source of the access request. Hence, services can easily be associated with the multifunction peripherals 10.

The control programs 78, 88, and 98 record the first user IDs in the data storage areas 75B and 85B. The control programs 78, 88, and 98 receive a first user ID from the information processing apparatus 50 and receive device IDs from multifunction peripherals 10 when the first user ID received from the information processing apparatus 50 matches a first user ID stored in the data storage areas 75B and 85B. The control programs 78, 88, and 98 subsequently store the device IDs received from the multifunction peripherals 10 in the data storage area 85B in association with the first user ID.

Accordingly, the user can store first user IDs in the data storage area 85B in association with device IDs.

For each device ID, the control programs 78, 88, and 98 determine whether a service ID is stored in the data storage area 75B in association with that device ID. When determining that a service ID is stored in association with the device ID, the control programs 78, 88, and 98 transmit an instruction to the information processing apparatus 50 to display the service name of the service ID on the device list page. When the control programs 78, 88, and 98 determine that a service ID is not stored in association with the device ID, the control programs 78, 88, and 98 transmit an instruction to the information processing apparatus 50 to display the "Register" icon 145 on the device list page.

Thus, when services are stored in association with device IDs, information specifying the services can be displayed on the information processing apparatus 50. When no services are stored in association with device IDs, the information processing apparatus 50 can be directed to display an option for storing a service in association with the device ID.

Accordingly, the user can learn what services are associated with each multifunction peripheral 10 when services are registered in association with the multifunction peripherals 10, and can easily perform operations to associate a multifunction peripheral 10 with a service using the multifunction peripheral 10 when a service is not registered in association with the multifunction peripheral 10.

The data storage area 75B stores associations of service IDs and the URLs of web pages for the services corresponding to these service IDs. When determining that a service ID is stored in association with a device ID, the control programs 78, 88, and 98 transmit to the information processing apparatus 50: an instruction to display an option to change service settings enabling the user to modify the details of the service corresponding to the service ID; and the URL of the web page for the service.

By redirecting the browser on the information processing apparatus 50 to the URL of the service registered in association with the multifunction peripheral 10, the control programs 78, 88, and 98 can prompt the information processing apparatus 50 to display a web page for the URL of that service. As a result, the user can easily modify the details of the service on the information processing apparatus 50.

When determining that a service ID is stored in association with the device ID, the control programs 78, 88, and 98 transmit to the information processing apparatus 50 an instruction to display an option to delete the service corresponding to the service ID or an instruction to display an option for switching from this service to another service.

Accordingly, the user can easily perform operations on the information processing apparatus 50 to delete registered services or to switch from a registered service to another service.

Since there is a plurality of types of services, the data storage area 95B stores each service ID in association with the category of the service represented by the service ID. When determining that a service ID is stored in association with a device ID, the control programs 78, 88, and 98 transmit to the information processing apparatus 50 an instruction not to display an option to register for services belonging to the same category as the category stored in association with this service ID. In other words, when determining that a service ID is stored in association with a device ID, the control programs 78, 88, and 98 does not transmit to the information processing apparatus 50 an instruction to display an option to register for services belonging to the same category as the category stored in association with this service ID. Further, the control programs 78, 88, and 98 transmit an instruction to the information processing apparatus 50 to display an option to add a service belonging to a category different from the category stored in association with this service ID.

Thus, when there is a plurality of types of services, the control programs 78, 88, and 98 do not display an option to add or register for services of the same category in order to prevent the user from mistakenly registering for services in the same category. Further, the user can easily register for services of different types.

When determining that no service ID is stored in association with the device ID of a multifunction peripheral 10, the control programs 78, 88, and 98 determine whether the multifunction peripheral 10 is in a connected state. When determining that the multifunction peripheral 10 is in a connected state, the control programs 78, 88, and 98 transmit an instruction to the information processing apparatus 50 to display an option for registering for services. When determining that the multifunction peripheral 10 is in a non-connected state, the control programs 78, 88, and 98 transmit an instruction to the information processing apparatus 50 not to display an option for registering for services. In other words, when determining that the multifunction peripheral 10 is in a non-connected state, the control programs 78, 88, and 98 do not transmit an instruction to the information processing apparatus 50 to display an option for registering for services.

Accordingly, the information processing apparatus 50 is prevented from displaying an option to register for a service that is not available when the multifunction peripheral 10 is in a non-connected state. Accordingly, the user is prevented from mistakenly requesting to register for services that are unavailable.

When determining that the multifunction peripheral 10 is in a non-connected state, the control programs 78, 88, and 98 also transmit an instruction to the information processing apparatus 50 to display a message prompting the user to check the connected state of the multifunction peripheral 10.

In this way, the user can easily be alerted to the fact that the multifunction peripheral 10 is in a non-connected state.

Variations of the Embodiment

While the disclosure has been described in detail with reference to the above embodiments thereof, it would be apparent to those skilled in the art that various changes and modifications may be made therein.

For example, the web server 70, the device information collecting server 80, and the service managing server 90 may be configured as a single device or a plurality of devices.

Processes performed by the controllers of the present disclosure are achieved by executing corresponding programs stored in the program storage areas 32A, 62A, 75A, 85A and 95A by the respective CPUs 31, 61, 74, 84, and 94 in the multifunction peripheral 10, the information processing apparatus 50, the web server 70, the device information collecting server 80, and the service managing server 90. The configurations of the controllers are not limited to this. That is, at least part of each controller may be achieved by hardware, such as, Integrated Circuit (IC). Specifically, at least part of each controller may be achieved by may be a CPU, a plurality of CPUs, an Application Specific Integrated Circuit (ASIC), a plurality of ASICs, or any combination of these.

When all or part of the functions in the present disclosure are implemented by computer programs performed by the multifunction peripheral 10, the information processing apparatus 50, the web server 70, the device information collecting server 80, and the service managing server 90, the programs can be stored on a non-transitory computer-readable storage medium. The "non-transitory computer-readable storage medium" may be a portable medium, such as a memory card, CD-ROM, or DVD-ROM; storages mounted in a server to which the multifunction peripheral 10, the information processing apparatus 50, the web server 70, the device information collecting server 80, and the service managing server 90 can access, or an external storage device. The programs stored in the storage of the server may be provided as information or signals indicating the programs via the network such as the Internet.

What is claimed is:

1. A server comprising:
a communication interface configured to communicate with an information processing apparatus, a plurality of image processing apparatuses, and a service-providing apparatus, each of the plurality of image processing apparatuses being configured to process an image, the service-providing apparatus being configured to provide a service using one of the plurality of image processing apparatuses;
a storage; and
a processor,
wherein the storage is configured to store:
first authentication information;
a plurality of sets of device information respectively identifying the plurality of image processing apparatuses, the plurality of sets of device information being assigned with the first authentication information;
service identification information for identifying the service that the service-providing apparatus is configured to provide, the service identification information being assigned with one of the plurality of sets of device information;
first address information of a first web page provided by the service-providing apparatus;
second address information for a second web page provided by the server; and
instructions that, when executed by the processor, cause the server to:
receive an access request from the information processing apparatus via the communication interface, the access request being for accessing the server and including address information of a source web page, the access request being generated in response to reception of the source web page;
receive second authentication information from the information processing apparatus via the communication interface to authenticate the information processing apparatus;
authenticate the information processing apparatus when the received second authentication information is determined to match the stored first authentication information;
receive a display request via the communication interface from the authenticated information processing apparatus using the second authentication information, the display request being for displaying, by the information processing apparatus, a set of device information from among the plurality of sets of device information stored in the storage;
in response to the display request, determine whether the address information of the source web page in the received access request indicates the service-providing apparatus or the server by referring to the first address information and the second address information; and
when the address information of the source web page indicates the service-providing apparatus, transmit to the information processing apparatus via the communication interface, at least one set of device information assigned to the service identification information indicating the service that the service-providing apparatus is configured to provide from among the plurality of sets of device information stored in the storage in association with the second authentication information that is determined to match the first authentication information.

2. The server according to claim 1, wherein when the address information of the source web page indicates the server, the instructions, when executed by the processor, cause the server further to transmit, to the information processing apparatus via the communication interface, all of the sets of device information that are stored in the storage in association with the second authentication information that is determined to match the first authentication information.

3. The server according to claim 1, wherein when the address information of the source web page indicates the service-providing apparatus, the instructions, when executed by the processor, cause the server further to transmit to the information processing apparatus via the communication interface at least one of the plurality of sets of device information that is stored in the storage in association with the second authentication information that is determined to match the first authentication information and that is capable of being assigned to the service that the service-providing apparatus is configured to provide.

4. The server according to claim 1, wherein the first authentication information stored in the storage has been stored in the storage by the processor, and
wherein the instructions, when executed by the processor, cause the server further to:
receive a set of device information from a corresponding one of the image processing apparatuses via the communication interface when the received second authentication information matches the first authentication information stored in the storage; and
store the received set of device information in association with the first authentication information in the storage.

5. The server according to claim 1, wherein the instructions, when executed by the processor, cause the server further to:
in response to the display request, determine whether the storage stores the service identification information in association with one of the plurality of sets of device information in association with the second authentication information that is determined to match the first authentication information;
when the storage stores the service identification information in association with one of the plurality of sets of device information in association with the second authentication information that is determined to match the first authentication information, transmit to the information processing apparatus via the communication interface an instruction to display first information indicating the service identified by the service identification information; and
when the storage does not store the service identification information in association with one of the plurality of sets of device information in association with the second authentication information that is determined to match the first authentication information, transmit to the information processing apparatus via the communication interface an instruction to display second information for receiving an instruction to store the service identification information in the storage in association with a set of device information.

6. The server according to claim 5, wherein the storage stores the service identification information and an address of a web page for the service identified by the service identification information in association with each other, wherein when the storage stores the service identification information, the instructions, when executed by the processor, cause the server further to transmit to the information processing apparatus via the communication interface an instruction to display setting change information and the address of the web page on the service-providing apparatus, the setting change information being for changing content of the service.

7. The server according to claim 5, wherein in response to determining that there is the service identification information stored in the storage in association with the one of the plurality of sets of device information, the instructions, when executed by the processor, cause the server further to transmit to an instruction to display information for deleting the service identification information in association with the one of the plurality of sets of device information from the storage or an instruction to display information for changing service settings.

8. The server according to claim 5, wherein the storage stores, in association with each other, the service identification information and a type of the service identified by the service identification information, wherein the instructions, when executed by the processor, cause the server further to:
transmit to the information processing apparatus via the communication interface an instruction not to display the second information for services belonging to a same type of the service identified by the service identification information; and
transmit, to the information processing apparatus via the communication interface, an instruction to display the second information for services belonging to any types of the service different from the type of the service identified by the service identification information.

9. The server according to claim 5, wherein the instructions, when executed by the processor, cause the server further to:
when the storage does not store the service identification information in association with one of the plurality of sets of device information in association with the second authentication information that is determined to match the first authentication information, determine whether an image processing apparatus identified by the one of the plurality of sets of device information is in an on-line state;
transmit to the instruction to display the second information to the information processing apparatus via the communication interface when the image processing apparatus is in the on-line state; and
transmit an instruction not to display the second information to the information processing apparatus via the communication interface when the image processing apparatus is in an off-line state.

10. The server according to claim 9, wherein when the image processing apparatus is in the off-line state, the instructions, when executed by the processor, cause the server further to transmit to an instruction to display a message for prompting to check network connection state of image processing apparatus.

11. A communication system comprising a server and an information processing apparatus,
wherein the server comprises:
a server communication interface configured to communicate with the information processing apparatus, a plurality of image processing apparatuses, and a service-providing apparatus, each of the plurality of image processing apparatuses being configured to process an image, the service-providing apparatus being configured to provide a service using one of the plurality of image processing apparatuses;
a storage storing:
first authentication information;
a plurality of sets of device information respectively identifying the plurality of image processing apparatuses, the plurality of sets of device information being assigned with the first authentication information;
service identification information for identifying the service that the service-providing apparatus is configured to provide, the service identification information being assigned with one of the plurality of sets of device information;
first address information of a first web page provided by the service-providing apparatus; and
second address information for a second web page provided by the server; and
a server processor,
wherein the information processing apparatus comprises:
a display;
a client communication interface configured to communicate with the server;
a client processor; and
a client storage configured to store instructions, when executed by the client processor, cause the information processing apparatus to:
transmit an access request to the server via the client communication interface, the access request being for accessing the server and including address information of a source web page, the access request being generated in response to reception of the source web page;
transmit second authentication information to the server via the client communication interface;
transmit a display request to the server via the client communication interface, the display request being for displaying, by the information processing apparatus, a set of device information from among the plurality of sets of device information stored in the storage; and
in response to receiving the display information from the server via the client communication interface, display at least one set of display information on the display,
wherein the server storage further stores instructions that, when executed by the server processor, cause the server to:
receive the access request from the information processing apparatus via the server communication interface;
receive the second authentication information from the information processing apparatus via the server communication interface to authenticate the information processing apparatus;

authenticate the information processing apparatus when the received second authentication information is determined to match the stored first authentication information;

receive the display request via the server communication interface from the authenticated information processing apparatus using the second authentication information;

in response to the display request, determine whether the address information of the source web page in the received access request indicates the service-providing apparatus or the server by referring to the first address information and the second address information; and when the address information of the source web page indicates the service- providing apparatus, transmit to the information processing apparatus via the server communication interface, the at least one set of device information assigned to the service identification information indicating the service that the service-providing apparatus is configured to provide from among the plurality of sets of device information stored in the storage in association with the second authentication information that is determined to match the first authentication information.

* * * * *